US 8,515,862 B2

(12) United States Patent
Zhang et al.

(10) Patent No.: US 8,515,862 B2
(45) Date of Patent: Aug. 20, 2013

(54) COMPUTER-IMPLEMENTED SYSTEMS AND METHODS FOR INTEGRATED MODEL VALIDATION FOR COMPLIANCE AND CREDIT RISK

(75) Inventors: Mingyuan Zhang, Cary, NC (US); Clark Richard Abrahams, Cary, NC (US)

(73) Assignee: SAS Institute Inc., Cary, NC (US)

( * ) Notice: Subject to any disclaimer, the term of this patent is extended or adjusted under 35 U.S.C. 154(b) by 310 days.

(21) Appl. No.: 12/475,150

(22) Filed: May 29, 2009

(65) Prior Publication Data
US 2009/0299896 A1 Dec. 3, 2009

Related U.S. Application Data

(60) Provisional application No. 61/130,319, filed on May 29, 2008.

(51) Int. Cl.
*G60Q 40/00* (2012.01)
(52) U.S. Cl.
USPC .......................................................... 705/38
(58) Field of Classification Search
None
See application file for complete search history.

(56) References Cited

U.S. PATENT DOCUMENTS

| | | |
|---|---|---|
| 5,335,291 A | 8/1994 | Kramer et al. |
| 5,448,684 A | 9/1995 | Holt |
| 5,500,513 A | 3/1996 | Langhans et al. |
| 5,519,319 A | 5/1996 | Smith et al. |
| 5,622,171 A | 4/1997 | Asada et al. |
| 5,627,886 A | 5/1997 | Bowman |
| 5,638,492 A | 6/1997 | Maeda et al. |
| 5,650,722 A | 7/1997 | Smith et al. |
| 5,675,253 A | 10/1997 | Smith et al. |
| 5,677,955 A | 10/1997 | Doggett et al. |
| 5,706,401 A | 1/1998 | Tresp |
| 5,727,161 A * | 3/1998 | Purcell, Jr. ................... 705/7.36 |
| 5,748,780 A | 5/1998 | Stolfo |
| 5,761,442 A | 6/1998 | Barr et al. |
| 5,819,226 A | 10/1998 | Gopinathan et al. |
| 5,832,068 A | 11/1998 | Smith |
| 5,835,902 A | 11/1998 | Jannarone |
| 5,884,289 A | 3/1999 | Anderson et al. |
| 5,903,830 A | 5/1999 | Joao et al. |
| 5,940,812 A | 8/1999 | Tengel et al. |
| 5,999,596 A | 12/1999 | Walker et al. |
| 6,016,480 A | 1/2000 | Houvener et al. |
| 6,021,943 A | 2/2000 | Chastain |
| 6,029,154 A | 2/2000 | Pettitt |
| 6,047,268 A | 4/2000 | Bartoli et al. |
| 6,047,287 A | 4/2000 | Caruna |

(Continued)

OTHER PUBLICATIONS

Oltmans, Arnold Wayne; Aggregate Loan Quality Assessment in the Farm Credit System; Ph.D. Thesis; University of Illinois at Urbana-Champaign, (1990).*

(Continued)

*Primary Examiner* — Virpi Kanervo
(74) *Attorney, Agent, or Firm* — Kilpatrick Townsend & Stockton LLP

(57) ABSTRACT

Computer-implemented systems and methods are provided for model validation of a model for compliance and credit risk. Model input, output, and processing validation areas are contained on a computer system. A handle data structure connects the model validation areas with handles that comprise a unified metric. A handle represents combinations of covariate patterns and describes the joint distribution of risk characteristics.

69 Claims, 24 Drawing Sheets

(56) References Cited

U.S. PATENT DOCUMENTS

| | | | |
|---|---|---|---|
| 6,064,990 A | 5/2000 | Goldsmith | |
| 6,112,190 A | 8/2000 | Fletcher et al. | |
| 6,122,624 A | 9/2000 | Tetro et al. | |
| 6,125,349 A | 9/2000 | Maher | |
| 6,128,602 A | 10/2000 | Northington et al. | |
| 6,170,744 B1 | 1/2001 | Lee et al. | |
| 6,202,053 B1 | 3/2001 | Christiansen et al. | |
| 6,251,608 B1 | 6/2001 | Levy | |
| 6,330,546 B1 | 12/2001 | Gopinathan et al. | |
| 6,360,326 B1 | 3/2002 | Hiles | |
| 6,388,592 B1 | 5/2002 | Natarajan | |
| 6,401,198 B1 | 6/2002 | Harmer et al. | |
| 6,422,462 B1 | 7/2002 | Cohen | |
| 6,453,206 B1 | 9/2002 | Soraghan et al. | |
| 6,516,056 B1 | 2/2003 | Justice et al. | |
| 6,549,861 B1 | 4/2003 | Mark et al. | |
| 6,570,968 B1 | 5/2003 | Marchand et al. | |
| 6,599,702 B1 | 7/2003 | Levy | |
| 6,601,049 B1 | 7/2003 | Cooper | |
| 6,613,519 B1 | 9/2003 | Levy | |
| 6,622,125 B1 | 9/2003 | Cragun et al. | |
| 6,631,212 B1 | 10/2003 | Luo et al. | |
| 6,650,779 B2 | 11/2003 | Vachesvanos et al. | |
| 6,675,145 B1 | 1/2004 | Yehia et al. | |
| 6,678,640 B2 | 1/2004 | Ishida et al. | |
| 6,845,336 B1 | 1/2005 | Kodukula et al. | |
| 6,901,398 B1 | 5/2005 | Horvitz et al. | |
| 7,117,191 B2 | 10/2006 | Gavan et al. | |
| 7,191,150 B1 | 3/2007 | Shao et al. | |
| 7,269,516 B2 | 9/2007 | Brunner et al. | |
| 7,392,216 B1* | 6/2008 | Palmgren et al. | 705/37 |
| 7,403,922 B1 | 7/2008 | Lewis et al. | |
| 7,455,226 B1 | 11/2008 | Hammond et al. | |
| 7,461,048 B2 | 12/2008 | Teverovskiy et al. | |
| 7,467,119 B2 | 12/2008 | Saidi et al. | |
| 7,480,640 B1 | 1/2009 | Elad et al. | |
| 7,536,348 B2 | 5/2009 | Shao et al. | |
| 7,562,058 B2 | 7/2009 | Pinto et al. | |
| 7,580,798 B2 | 8/2009 | Brunner et al. | |
| 7,610,257 B1 | 10/2009 | Abrahams | |
| 7,761,379 B2 | 7/2010 | Zoldie et al. | |
| 7,765,148 B2 | 7/2010 | German et al. | |
| 7,788,195 B1 | 8/2010 | Subramanian et al. | |
| 7,801,839 B2 | 9/2010 | Kates et al. | |
| 7,912,773 B1 | 3/2011 | Subramanian et al. | |
| 7,962,404 B1 | 6/2011 | Metzger et al. | |
| 8,065,227 B1 | 11/2011 | Beckman | |
| 8,280,805 B1 | 10/2012 | Abrahams et al. | |
| 2001/0056379 A1 | 12/2001 | Fujinaga et al. | |
| 2002/0055954 A1* | 5/2002 | Breuer | 707/507 |
| 2002/0099635 A1 | 7/2002 | Guiragosian | |
| 2002/0138417 A1 | 9/2002 | Lawrence | |
| 2002/0194119 A1 | 12/2002 | Wright et al. | |
| 2003/0093366 A1 | 5/2003 | Halper et al. | |
| 2003/0097330 A1 | 5/2003 | Hillmer et al. | |
| 2003/0140000 A1 | 7/2003 | Lee | |
| 2003/0191709 A1 | 10/2003 | Elston et al. | |
| 2004/0039688 A1 | 2/2004 | Sulkowski et al. | |
| 2004/0186815 A1 | 9/2004 | Stockfisch | |
| 2004/0236696 A1 | 11/2004 | Aoki et al. | |
| 2004/0267660 A1 | 12/2004 | Greenwood et al. | |
| 2005/0055373 A1 | 3/2005 | Forman | |
| 2005/0060207 A1* | 3/2005 | Weidner et al. | 705/4 |
| 2005/0065871 A1 | 3/2005 | Gerhart et al. | |
| 2005/0065872 A1* | 3/2005 | Moebs et al. | 705/38 |
| 2005/0076230 A1 | 4/2005 | Redenbaugh et al. | |
| 2005/0097320 A1 | 5/2005 | Golan et al. | |
| 2005/0131873 A1 | 6/2005 | Fan et al. | |
| 2005/0222928 A1 | 10/2005 | Steier et al. | |
| 2006/0020814 A1 | 1/2006 | Lieblich et al. | |
| 2006/0085325 A1 | 4/2006 | Jammal et al. | |
| 2006/0106700 A1 | 5/2006 | Boren et al. | |
| 2006/0181411 A1 | 8/2006 | Fast et al. | |
| 2006/0195391 A1* | 8/2006 | Stanelle | 705/38 |
| 2006/0212386 A1 | 9/2006 | Willey et al. | |
| 2006/0218169 A1 | 9/2006 | Steinberg et al. | |
| 2006/0282359 A1* | 12/2006 | Nobili et al. | 705/35 |
| 2007/0038567 A1 | 2/2007 | Allaire et al. | |
| 2007/0055595 A1* | 3/2007 | Keyes et al. | 705/35 |
| 2007/0106582 A1 | 5/2007 | Baker et al. | |
| 2007/0136187 A1 | 6/2007 | Libman | |
| 2007/0192167 A1 | 8/2007 | Lei et al. | |
| 2007/0198401 A1 | 8/2007 | Kunz | |
| 2007/0219817 A1 | 9/2007 | Wu | |
| 2007/0226129 A1 | 9/2007 | Liao et al. | |
| 2007/0239606 A1 | 10/2007 | Eisen | |
| 2008/0114783 A1* | 5/2008 | Nguyen et al. | 707/100 |
| 2008/0126267 A1 | 5/2008 | Rosen et al. | |
| 2008/0133518 A1 | 6/2008 | Kapoor et al. | |
| 2008/0134236 A1 | 6/2008 | Iijima et al. | |
| 2008/0195528 A1* | 8/2008 | Keithley | 705/38 |
| 2008/0243569 A1 | 10/2008 | Hadden | |
| 2008/0301038 A1 | 12/2008 | Anderson et al. | |
| 2009/0018955 A1 | 1/2009 | Chen et al. | |
| 2009/0125973 A1* | 5/2009 | Byers et al. | 726/1 |
| 2009/0171834 A1 | 7/2009 | Liu et al. | |
| 2009/0192855 A1 | 7/2009 | Subramanian et al. | |
| 2009/0192957 A1 | 7/2009 | Subramanian et al. | |
| 2009/0254487 A1 | 10/2009 | Dhar et al. | |
| 2009/0299911 A1 | 12/2009 | Abrahams | |
| 2009/0307028 A1 | 12/2009 | Eldon et al. | |
| 2010/0042454 A1 | 2/2010 | Liao et al. | |
| 2011/0112955 A1* | 5/2011 | Nolan et al. | 705/38 |
| 2012/0296806 A1 | 11/2012 | Abrahams | |

OTHER PUBLICATIONS

Anonymous; Community Banks FAce Challenges, Opprtunities in Changing Economic Times; Item Processing Report, vol. 13, Iss. 7, (Apr. 2002).*

Xing, Fang Xiao; A Research about Option-GARCH Method in Credit Risk Measurement; (Abstract); M.S. Thesis; East China Normal University (People's Republic of China), (2008).*

Andrews, C.J., "Evaluating Risk Management Strategies in Resource Planning," IEEE Transactions on Power Systems, vol. 10, Issue 1, pp. 420-426 (Feb. 1995).

Bond, Erik et al., "Risk Analysis for the Security of VDOT Smart Traffic Centers," Systems and Information Engineering Design Symposium, IEEE, pp. 1-6 (Apr. 27, 2007).

Kahn, Shulamit, "Economic Estimates of the Value of Life," IEEE Technology and Society Magazine, vol. 5, Issue 2, pp. 24-31 (Jun. 1986).

Srivatsa, Mudhakar et al., "Securing information flows: A quantitative risk analysis approach," Military Communications Conference, IEEE, pp. 1-7 (Nov. 16-19, 2008).

Credit Technologies, Inc. News and Press Center—19 pages at www.credittechnologies.com/news_center.asp downloaded Mar. 14, 2011.

Brause, Rudiger W., "Cascaded Vector Quantization by Non-Linear PCA Network Layers", IEEE, pp. 154-160 (1994).

Chan, Lipchen Alex et al., "Automatic target detection using dualband infrared imager", Acoustics, Speech, and Signal PICASSP'OO. Proceedings, 2000 IEEE International Conference, pp. 2286-2289 (Jun. 9, 2000).

Chatterjee, Chanchal et al., "Self-Organizing Algorithms for Generalized Eigen-Decomposition", IEEE Transactions on Neural Networks, vol. 8, No. 6, pp. 1518-1530 (Nov. 1997).

Chen, Yupeng et al., "High Resolution Adaptive Bearing Estimation Using a Complex-Weighted Neural Network", IEEE, 0-7803-0532-9/92, pp. II-317-III-320 (1992).

Mehrotra, Kishan et al., "Elements of Artificial Neural Networks", MIT Press, pp. 11, 25, 71 76, 85-87, 157, 170-171 (1997).

Wong, AS.Y. et al., "A Unified Sequential Method for PCA", IEEE, pp. 583•586 (1999).

Lazarevic, Aleksandar et al., "Feature Bagging for Outlier Detection," Research Track Paper, pp. 157-166 (2005).

Pelleg, Dan et al., "Active Learning for Anomaly and Rare-Category Detection," School of Computer Science, Carnegie Mellon University, 8 pp. (2004).

Abdel-Wahhab, O. et al., "Image compression using multi-layer neural networks,", Proceedings of the Second IEEE Symposium on Computers and Communications, vol. 144, Issue 5, pp. 307-312 (Oct. 1997).

Almgren, Magnus et al., "Using Active Learning in Intrusion Detection," Proceedings of the 17 IEEE Computer Security Foundations Workshop, 11 pp. (2004).

Andras, Peter, "The Equivalence of Support Vector Machine and Regularization Neural Networks," Neural Processing Letters, 65, pp. 97-104 (2002).

Gabrys, Bogdan et al., "Combining labeled and unlabelled data in the design of pattern classification systems," International Journal of Approximate Reasoning, 35, pp. 251-273 (2004).

Gunter, Simon, "Multiple Classifier Systems in Offline Cursive Handwriting Recognition," cover page and page 4 (2004).

Hawkins, Simon et al., "Outlier Detection Using Replicator Neural Networks," Proceedings of the Fifth International Conference and Data Warehousing and Knowledge Discovery, 10 pp. (2002).

Hinterseer, Kris, "The Wolfsberg Anti-Money Laundering Principles," Journal of Money Laundering Control, vol. 5, No. I pp. 25-41 (Summer 2001).

Miyazaki, Anthony D. et al., "Internet Privacy and Security: An Examination of Online Retailer Disclosures," Journal of Public Policy & Marketing, vol. 19, No. I, pp. 54-61 (Spring 2000).

Tsai, Chieh-Yuan, et al., "A Dynamic Web Service based Data Mining Process System", Proceedings of the 2005 The Fifth International Conference on Computer and Information Technology, pp. 1033-1039 (2005).

West, David et al., "Neural network ensemble strategies for financial decision applications," Computers & Operations Research, 32, pp. 2543-2559 (2005).

Williams, Graham et al., "A Comparative Study of RNN for Outlier Detection in Data Mining," Proceedings of the 2002 IEEE International Conference on Data Mining 12 pp. (2002).

Zhang, Tiezhu et al., "Study on the Application of Dynamic Balanced Scorecard in the Service Industry", 2008 International Conference on Intelligent Computation Technology and Automation, Digital Object Identifier: 10.1109/ICICTA.2008.359, pp. 1158-1162 (2008).

Deng et al., Irrational Borrowers and the Pricing of Residential Mortgages, 33 pp. available at www.4.stern.nyu.edu/finance/docs/pdfs/Seminars/073f-deng.pdf, (Sep. 2007).

Hall, Arden, Controlling for Burnout in Estimating Mortgage Prepayment Models, Journal of Housing Economics, vol. 9, pp. 215-232, (2000).

Staten, Michael E., Maximizing the Benefits from Credit Reporting, Transunion White Paper, 14 pp. available at www.transunion.com/docs/rev/aboutTransunion/_maximizing_the-Benefits-from-Credit-eporting%20_Michaei_Staten.pdf, (2008).

Final Office Action of Nov. 29, 2012 for U.S. Appl. No. 12/418,186, 16 pages.

Non-Final Office Action of Jun. 24, 2011 for U.S. Appl. No. 12/418,186, 16 pages.

Notice of Allowance of Sep. 29, 2010 for U.S. Appl. No. 11/691,277, 9 pages.

Non-Final Office Action of Sep. 28, 2010 for U.S. Appl. No. 11/691,270, 17 pages.

Final Office Action of Mar. 22, 2011 for U.S. Appl. No. 11/691,270, 16 pages.

Non-Final Office Action of Jul. 14, 2011 for U.S. Appl. No. 12/325,468, 9 pages.

Notice of Allowance of May 1, 2012 for U.S. Appl. No. 12/325,468, 14 pages.

Non-Final Office Action of Mar. 3, 2011 for U.S. Appl. No. 12/474,941, 16 pages.

Final Office Action of Dec. 28, 2011 for U.S. Appl. No. 12/474,941, 16 pages.

Notice of Allowance of Feb. 28, 2013 for U.S. Appl. No. 12/474,941, 12 pages.

Non-Final Office Action of Sep. 20, 2011 for U.S. Appl. No. 12/418,174, 15 pages.

Final Office Action of Aug. 2, 2012 for U.S. Appl. No. 12/418,174, 14 pages.

Non-Final Office Action of Sep. 7, 2012 for U.S. Appl. No. 13/561,121, 16 pages.

* cited by examiner

HANDLE EXAMPLE

| DISTINCT COMBINATIONS | SIMPLE 2-FACTOR CREDIT SCORE | DEFAULT PROBABILITY | ASSOCIATED HANDLE CELL |
|---|---|---|---|
| 1 | 80 | 0.0588 | 5 |
| 2 | 100 | 0.0294 | 6,9 |
| 2 | 120 | 0.0147 | 1,10 |
| 1 | 152 | 0.0059 | 7 |
| 2 | 160 | 0.0037 | 2,8 |
| 1 | 172 | 0.0029 | 11 |
| 1 | 180 | 0.0018 | 12 |
| 1 | 192 | 0.0015 | 3 |
| 1 | 200 | 0.0009 | 4 |

Fig. 3

| RISK RANK | HANDLE NUMBER | CREDIT HISTORY | LOAN TO VALUE RATIO | DEBT TO INCOME RATIO | INCOME | BUREAU SCORE | LOANS | TOTAL NUMBER OF LOANS | % CUMULATIVE LOANS | % DEFAULT | NUMBER OF DEFAULTS |
|---|---|---|---|---|---|---|---|---|---|---|---|
| 1 | 8 | FAIR/POOR | LOW | HIGH | LOW | LOW | 402 | 402 | 5.03 | 80% | 256 |
| 2 | 0 | FAIR/POOR | HIGH | HIGH | LOW | LOW | 656 | 1058 | 13.23 | 77% | 403 |
| 3 | 12 | FAIR/POOR | LOW | HIGH | LOW | HIGH | 328 | 1386 | 17.33 | 72% | 187 |
| 4 | 4 | FAIR/POOR | HIGH | HIGH | LOW | HIGH | 628 | 2014 | 25.18 | 70% | 367 |
| ... | ... | ... | ... | ... | ... | ... | ... | ... | ... | ... | ... |
| 27 | 30 | GOOD | LOW | LOW | LOW | HIGH | 266 | 6499 | 81.24 | 22% | 47 |
| 28 | 23 | GOOD | HIGH | LOW | HIGH | HIGH | 83 | 6582 | 82.28 | 19% | 13 |
| 29 | 31 | GOOD | LOW | LOW | HIGH | HIGH | 717 | 7299 | 91.24 | 18% | 102 |
| 30 | 6 | GOOD | HIGH | HIGH | LOW | HIGH | 325 | 7624 | 95.3 | 18% | 48 |
| 31 | 15 | GOOD | LOW | HIGH | HIGH | HIGH | 204 | 7828 | 97.85 | 15% | 25 |
| 32 | 7 | GOOD | HIGH | HIGH | HIGH | HIGH | 172 | 8000 | 100 | 14% | 18 |

RANKING HANDLE CELLS

COHESIVE HANDLE WITH INFERRED RISK ESTIMATES FOR STATISTICAL TESTING

| HANDLE | RISK | ACTUAL DEFAULT RATE | ESTIMATED DEFAULT RATE |
|---|---|---|---|
| 1 | 0 | 0.0001 | 0.0001 |
| 2 | 1 | 0.001 | 0.001 |
| 4 | 1 | N/A | 0.0026 |
| 10 | 1 | 0.008 | 0.008 |
| 3 | 2 | N/A | 0.01 |
| 5 | 2 | 0.02 | 0.013 |
| 7 | 2 | N/A | 0.165 |
| ... | ... | ... | ... |
| 25 | 4 | N/A | 0.75 |
| 26 | 4 | 0.8 | 0.8 |
| 27 | 5 | 0.9999 | 0.9999 |

*Fig. 5*

EXAMPLE SCORECARD

| 2-FACTOR SCORECARD | | | | |
|---|---|---|---|---|
| CREDIT FILE DEPTH | GOOD | BAD | ODDS | POINTS |
| NO FILE | 10% | 40% | 1/4 | 0 |
| THIN FILE | 20% | 40% | 1/2 | 20 |
| MODERATE | 30% | 10% | 3/1 | 72 |
| THICK | 40% | 10% | 4/1 | 80 |
| HOUSING STATUS | GOOD | BAD | ODDS | POINTS |
| OWN | 60% | 30% | 2/1 | 40 |
| RENT | 30% | 60% | 1/2 | 0 |
| OTHER | 10% | 10% | 1/1 | 20 |
| POPULATION ODDS | 94% | 6% | 16/1 | 80 (ADD TO EVERY SCORE) |

*Fig. 6*

CORRESPONDING ACTION TABLE

FOR STRATEGY CORRESPONDING TO SCORE CUT-OFF = 146

| CREDIT FILE | NO FILE | THIN FILE | MODERATE | THICK |
|---|---|---|---|---|
| HOUSING | | | | |
| OWN | 1. DECLINE | 2. APPROVE | 3. APPROVE | 4. APPROVE |
| RENT | 5. DECLINE | 6. DECLINE | 7. APPROVE | 8. APPROVE |
| OTHER | 9. DECLINE | 10. DECLINE | 11. APPROVE | 12. APPROVE |

*Fig. 7*

COHESIVE HANDLES WITH
INFERRED RISK ESTIMATES — 900

| HANDLE | RISK | ACTUAL DEFAULT RATE | ESTIMATED DEFAULT RATE |
|---|---|---|---|
| 1 | 0 | 0.0001 | 0.0001 |
| 2 | 1 | 0.001 | 0.001 |
| 4 | 1 | N/A | 0.0026 |
| 10 | 1 | 0.008 | 0.008 |
| 3 | 2 | N/A | 0.01 |
| 5 | 2 | 0.02 | 0.013 |
| 7 | 2 | N/A | 0.165 |
| 11 | 2 | 0.03 | 0.03 |
| 13 | 2 | 0.035 | 0.035 |
| 14 | 2 | 0.04 | 0.04 |
| 16 | 2 | N/A | 0.045 |
| 19 | 2 | 0.05 | 0.05 |
| 20 | 2 | 0.06 | 0.06 |
| 22 | 2 | 0.08 | 0.08 |
| 6 | 3 | 0.1 | 0.1 |
| 8 | 3 | 0.2 | 0.2 |
| 12 | 3 | 0.25 | 0.25 |
| 15 | 3 | N/A | 0.3 |
| 17 | 3 | 0.35 | 0.35 |
| 23 | 3 | 0.4 | 0.4 |
| 9 | 4 | 0.5 | 0.5 |
| 18 | 4 | 0.6 | 0.6 |
| 21 | 4 | N/A | 0.65 |
| 24 | 4 | 0.7 | 0.7 |
| 25 | 4 | N/A | 0.75 |
| 26 | 4 | 0.8 | 0.8 |
| 27 | 5 | 0.9999 | 0.9999 |

RANKING HANDLE CELLS

| RISK RANK | HANDLE NUMBER | CREDIT HISTORY | LOAN TO VALUE RATIO | DEBT TO INCOME RATIO | INCOME | BUREAU SCORE | LOANS | TOTAL NUMBER OF LOANS | % CUMULATIVE LOANS | % DEFAULT | NUMBER OF DEFAULTS |
|---|---|---|---|---|---|---|---|---|---|---|---|
| 1 | 8 | FAIR/POOR | LOW | HIGH | LOW | LOW | 402 | 402 | 5.03 | 80% | 256 |
| 2 | 0 | FAIR/POOR | HIGH | HIGH | LOW | LOW | 656 | 1058 | 13.23 | 77% | 403 |
| 3 | 12 | FAIR/POOR | LOW | HIGH | LOW | HIGH | 328 | 1386 | 17.33 | 72% | 187 |
| 4 | 4 | FAIR/POOR | HIGH | HIGH | LOW | HIGH | 628 | 2014 | 25.18 | 70% | 367 |
| 5 | 16 | FAIR/POOR | HIGH | LOW | LOW | LOW | 221 | 2235 | 27.94 | 68% | 123 |
| 6 | 24 | FAIR/POOR | LOW | LOW | LOW | LOW | 134 | 2369 | 29.61 | 67% | 73 |
| 7 | 20 | FAIR/POOR | HIGH | LOW | LOW | HIGH | 178 | 2547 | 31.84 | 66% | 95 |
| 8 | 5 | FAIR/POOR | HIGH | HIGH | HIGH | HIGH | 327 | 2874 | 35.93 | 56% | 149 |
| 9 | 28 | FAIR/POOR | LOW | LOW | LOW | HIGH | 200 | 3074 | 38.43 | 55% | 90 |
| 10 | 9 | FAIR/POOR | LOW | HIGH | HIGH | LOW | 172 | 3246 | 40.58 | 53% | 73 |
| 11 | 1 | FAIR/POOR | HIGH | HIGH | HIGH | LOW | 375 | 3621 | 45.26 | 51% | 162 |
| 12 | 2 | GOOD | HIGH | HIGH | LOW | LOW | 281 | 3902 | 48.78 | 48% | 111 |
| 13 | 3 | GOOD | HIGH | HIGH | HIGH | LOW | 214 | 4116 | 51.45 | 47% | 81 |
| 14 | 17 | FAIR/POOR | HIGH | LOW | HIGH | LOW | 130 | 4246 | 53.08 | 46% | 50 |

MATCH TO FIG. 11B

| | | | MATCH TO FIG.11A | | | | | | |
|---|---|---|---|---|---|---|---|---|---|
| 15 | 13 | FAIR/POOR | LOW | HIGH | HIGH | HIGH | 286 | 4532 | 56.65 | 44% | 103 |
| 16 | 18 | GOOD | HIGH | LOW | LOW | LOW | 164 | 4696 | 58.7 | 44% | 57 |
| 17 | 25 | FAIR/POOR | LOW | LOW | LOW | LOW | 82 | 4778 | 59.73 | 43% | 26 |
| 18 | 21 | FAIR/POOR | HIGH | LOW | HIGH | HIGH | 108 | 4886 | 61.08 | 39% | 34 |
| 19 | 10 | GOOD | LOW | HIGH | LOW | LOW | 179 | 5065 | 63.31 | 38% | 56 |
| 20 | 11 | GOOD | LOW | HIGH | HIGH | LOW | 92 | 5157 | 64.46 | 37% | 28 |
| 21 | 19 | GOOD | HIGH | LOW | HIGH | LOW | 94 | 5251 | 65.64 | 33% | 26 |
| 22 | 26 | GOOD | LOW | LOW | LOW | LOW | 93 | 5344 | 66.8 | 32% | 25 |
| 23 | 29 | FAIR/POOR | LOW | LOW | HIGH | HIGH | 443 | 5787 | 72.34 | 31% | 109 |
| 24 | 27 | GOOD | LOW | LOW | LOW | LOW | 103 | 5890 | 73.62 | 27% | 21 |
| 25 | 14 | GOOD | LOW | HIGH | HIGH | HIGH | 184 | 6074 | 75.93 | 25% | 37 |
| 26 | 22 | GOOD | HIGH | LOW | LOW | HIGH | 159 | 6233 | 77.91 | 22% | 30 |
| 27 | 30 | GOOD | LOW | LOW | LOW | HIGH | 266 | 6499 | 81.24 | 22% | 47 |
| 28 | 23 | GOOD | HIGH | HIGH | HIGH | HIGH | 83 | 6582 | 82.28 | 19% | 13 |
| 29 | 31 | GOOD | LOW | LOW | LOW | HIGH | 717 | 7299 | 91.24 | 18% | 102 |
| 30 | 6 | GOOD | HIGH | HIGH | HIGH | HIGH | 325 | 7624 | 95.3 | 18% | 48 |
| 31 | 15 | GOOD | LOW | HIGH | HIGH | HIGH | 204 | 7828 | 97.85 | 15% | 25 |
| 32 | 7 | GOOD | HIGH | HIGH | HIGH | HIGH | 172 | 8000 | 100 | 14% | 18 |

Fig. 11B

K-S TEST FOR STATISTICAL SIGNIFICANCE OF DIFFERENCE
IN RISK DISTRIBUTIONS ACROSS MINORITY STATUS

| KOLMOGOROV-SMIRNOV TEST FOR VARIABLE RISK RANK CLASSIFIED BY VARIABLE RACE/ETHNICITY | | | |
|---|---|---|---|
| RACE/ETHNICITY VALUES | N | EDF AT MAXIMUM | DEVIATION FROM MEAN AT MAXIMUM |
| WHITE NON-HISPANIC | 3,242 | 0.306909 | -10.63844 |
| ALL OTHERS, INCLUDING HISPANIC | 4,758 | 0.621059 | 8.781572 |
| TOTAL | 8,000 | 0.49375 | |
| MAXIMUM DEVIATION OCCURRED AT OBSERVATION | 4,051 | | |
| VALUE OF RISK RANK AT MAXIMUM | 13.0 | | |

| KOLMOGOROV-SMIRNOV TWO-SAMPLE TEST (ASYMPTOTIC) | | |
|---|---|---|
| KS | 0.154229 | 0.31415 |
| KSa | 13.79465 | Pr > KSa <.0001 |

*Fig. 15*

COMPARISON OF RISK DISTRIBUTION BETWEEN MODEL INPUT AND MODEL OUTPUT

| HANDLE NUMBER | OBSERVED PROBABILITY OF DEFAULT | PREDICTED PROBABILITY OF DEFAULT | RISK RANK/ OBSERVED | RISK RANK/ PREDICTED | RESIDUAL |
|---|---|---|---|---|---|
| 0 | 0.772 | 0.772 | 2 | 1 | 0 |
| 1 | 0.511 | 0.62 | 11 | 7 | -0.109 |
| 2 | 0.485 | 0.469 | 12 | 14 | 0.016 |
| 3 | 0.466 | 0.299 | 13 | 23 | 0.167 |
| 4 | 0.704 | 0.662 | 4 | 5 | 0.042 |
| 5 | 0.564 | 0.486 | 8 | 13 | 0.079 |
| 6 | 0.179 | 0.338 | 30 | 21 | -0.159 |
| 7 | 0.135 | 0.198 | 32 | 29 | -0.062 |
| 8 | 0.803 | 0.752 | 1 | 2 | 0.05 |
| 9 | 0.525 | 0.594 | 10 | 8 | -0.069 |
| 10 | 0.384 | 0.442 | 19 | 16 | -0.058 |
| 11 | 0.373 | 0.276 | 20 | 24 | 0.097 |
| 12 | 0.722 | 0.637 | 3 | 6 | 0.085 |
| 13 | 0.442 | 0.458 | 15 | 15 | -0.016 |
| 14 | 0.253 | 0.314 | 25 | 22 | -0.061 |
| 15 | 0.152 | 0.181 | 31 | 30 | -0.028 |
| 16 | 0.68 | 0.707 | 5 | 3 | -0.027 |
| 17 | 0.463 | 0.537 | 14 | 11 | -0.074 |
| 18 | 0.442 | 0.386 | 16 | 18 | 0.056 |
| 19 | 0.333 | 0.233 | 21 | 27 | 0.101 |
| 20 | 0.664 | 0.582 | 7 | 9 | 0.082 |
| 21 | 0.391 | 0.402 | 18 | 17 | -0.011 |
| 22 | 0.224 | 0.267 | 26 | 25 | -0.043 |
| 23 | 0.191 | 0.149 | 28 | 31 | 0.042 |
| 24 | 0.67 | 0.683 | 6 | 4 | -0.014 |
| 25 | 0.426 | 0.51 | 17 | 12 | -0.084 |
| 26 | 0.321 | 0.36 | 22 | 20 | -0.04 |
| 27 | 0.266 | 0.214 | 24 | 28 | 0.052 |
| 28 | 0.545 | 0.555 | 9 | 10 | -0.01 |
| 29 | 0.311 | 0.376 | 23 | 19 | -0.065 |
| 30 | 0.219 | 0.246 | 27 | 26 | -0.027 |

Fig. 17

HOME IMPROVEMENT SCORECARD OVERRIDE
MONITORING SUMMARY FOR 3Q2007

| OVERRIDE TYPE/GROUP | NUMBER | PERCENT |
|---|---|---|
| LOW-SIDE | | |
| • CONTROL GROUP | 390 | 6 |
| • TREATMENT GROUP | 105 | 3 |
| TOTAL LSOs | 495 | 5 |
| HIGH SIDE | | |
| • CONTROL GROUP | 520 | 8 |
| • TREATMENT GROUP | 420 | 12 |
| TOTAL HSOs | 940 | 9 |
| NON-OVERRIDES | | |
| • CONTROL GROUP | 5,590 | 86 |
| • TREATMENT GROUP | 2,975 | 85 |
| TOTAL NON-OVERRIDES | 8,565 | 86 |
| TOTAL APPLICATIONS | 10,000 | 100 |
| • CONTROL GROUP | 6,500 | 65 |
| • TREATMENT GROUP | 3,500 | 35 |

Fig. 19

MODEL RISK INDICATOR RANKING EXAMPLE ⟵ 2200

| MODEL NUMBER | MODEL LIFT DECAY INDEX | MODEL PERFORMANCE INDEX | MODEL PROFITABILITY INDEX | MODEL STABILITY INDEX | RISK INDICATOR |
|---|---|---|---|---|---|
| 97 | 3 | 9 | 1 | 0.15 | 5.8012 |
| 99 | 2 | 6 | 3 | 0.08 | 5.1576 |
| 70 | 1 | 10 | 0 | 0.32 | 4.9298 |
| 46 | 1 | 9 | 3 | 0.83 | 4.9196 |
| 48 | 1 | 10 | 1 | 0.4 | 4.637 |
| 86 | 3 | 0.2 | 3 | 0.87 | 4.5554 |
| 96 | 2 | 2.5 | 3 | 0.32 | 4.3998 |
| 100 | 3 | 1 | 0 | 0.11 | 4.3578 |
| 91 | 3 | 0.33 | 2 | 0.52 | 4.2439 |
| 93 | 3 | 1.67 | 1 | 0.83 | 4.1068 |

Fig. 23

COMPUTER-IMPLEMENTED SYSTEMS AND METHODS FOR INTEGRATED MODEL VALIDATION FOR COMPLIANCE AND CREDIT RISK

CROSS-REFERENCE TO RELATED APPLICATION

This application claims priority to and the benefit of the following applications: U.S. Application Ser. No. 61/130,319, (entitled "Computer-Implemented Risk Evaluation And Model Validation Systems And Methods" and filed on May 29, 2008); and U.S. patent application Ser. No. 12/325,468 filed Dec. 1, 2008 entitled "Computer-Implemented Risk Evaluation Systems And Methods" which claims priority to U.S. Patent Application Ser. No. 60/991,050 filed Nov. 29, 2007 entitled "Computer-Implemented Risk Evaluation Systems And Methods." The entire disclosures (including any and all figures) of all of these applications are incorporated herein by reference.

TECHNICAL FIELD

This document relates generally to computer-implemented loan evaluation systems and more particularly to computer-implemented systems and methods for integrated model validation for compliance and credit risk.

BACKGROUND AND SUMMARY

The magnitude of the current economic crisis makes it abundantly clear that there is significant room, and need, for improvement in current credit assessment approaches. With fallout from the 2007 mortgage market problems lingering into 2008, large investment banks and other institutions have being forced to sharply increase their write-offs on mortgage-linked assets to the scale of tens of billions of dollars. As the subprime mortgage market crisis continues to unfold, lenders, investors and other market participants are exploring cause and cure of the subprime problems, especially in the area of credit scoring models.

Credit scoring models have been extensively used in consumer lending to assist a wide range of decision-making process associated with both loan underwriting and pricing. Automated consumer credit scoring models have made it possible for lenders to process far more applications in a shorter period of time than was possible when manual loan underwriting processes were used. Furthermore, credit scoring has proven to be more efficient, objective, consistent, cost-effective, and transparent than the systems they have replaced. As a result, this has significantly improved the efficiency, fairness, and accessibility of the mortgage market.

Credit models are necessarily complex because the business processes and policy rules that they embody, for both underwriting and pricing, are fairly intricate. For example, they have to ensure their credit risk models are in line with consumer protection regulations governing lending practices, so as to minimize the risk of compliance violations.

Regulators and policymakers recognize the potential for misapplication, or misspecification, of credit models. Problems can occur at any point in the modeling process, including data gathering, data cleansing, observation selection, formulation of model assumptions, sourcing of business rules, actual model specification, model validation, model deployment, model execution, model monitoring, model maintenance, and model re-development. Even if the model is correct, care must be given to ensure that the proper model is used for the appropriate segment of business and that model performance is maintained at acceptable levels. Substandard performance in one or more of these areas can lead to regulatory actions that can affect the institution's credit ratings and capital requirements

SUMMARY

The systems and methods disclosed herein recognize that qualitative elements can be important due to the emergence of hybrid models (i.e., combined judgmental and scoring). Qualitative components of validation methods are associated with the inclusion of subjective knowledge and contextual references. Basel II emphasizes the importance of qualitative, process-oriented component, in addition to quantitative statistical methods. In fact, cohesive and consistent model performance metrics integrate both quantitative and qualitative measures.

As an example, a system and method can be configured to address model risk from both qualitative and quantitative perspectives for all relevant areas in an integrated fashion. A system and method can be constructed with one or more of the following features:

Different model validation areas are connected with a unified metric (handle) to simplify validation processing and enhance efficiency and interpretability. A handle, which represents all possible combinations of covariate patterns and describes the joint distribution of risk characteristics. Handle cells include subjective assessments of business scenarios based upon corporate policy, consensus of expert opinion, or compliance requirements. Each handle cell represents a homogeneous segment in terms of risk, performance, and choice behavior, etc. The handle method captures population risk profile in model input data that is represented and evaluated in terms of handle cell distribution. The model predicted risk score (e.g., probability of default) is associated with model input risk profile by handle number. This allows a direct comparison between the observed risk in input data and the predicted risk in model outputs. The residual between the predicted risk score and the input risk distribution (or profile) are further analyzed for root causes.

This handle method allows specific treatment of data segments. Unlike a K-S test, which takes no specific consideration of different segments, a handle allows embedding class priors by utilizing different thresholds and business policy. This, to a certain degree, overcomes the common weakness associated with the standard validation metrics, and allows more accurate, and explicit, testing of model discriminatory power. In addition, the handle method creates a natural grouping definition and its effectiveness does not depend on binning.

Model performance is measured from both credit risk and compliance perspectives aided by an optimization process. The dual objective is to maximize model predictability for "good versus bad" performance and to minimize disparate impact on all relative constituencies, subject to a set of constraints that encompass line of business, regulatory, credit risk, portfolio and resource limitations. A risk quadrants plot is used to balance the trade-offs between compliance risk and credit risk. The outputs from this optimization process can help banks make decision on model rebuilding according to available resources and to address both credit losses and regulatory requirements.

While the disclosure is illustrated mainly with examples of consumer lending default risk models, the techniques disclosed herein also can be applied in many other situations, such as creating risk tiers for loss forecasting and estimating default probabilities for risk ratings used in commercial credit.

As another example, a system and method for model validation for compliance and credit risk can include one or more of the following:

Different model validation areas are connected with a unified metric (handle) to simplify validation processing and enhance efficiency and interpretability. This provides the following:

- Allow flexible grouping of data for statistical testing and analysis. Unlike a K-S test, which takes no specific consideration of different segments, a handle allows to embed class priors by utilizing different thresholds and business policy. This, to a certain degree, overcomes the common weakness associated with the standard validation metrics, and allows more accurate, and explicit, testing of model discriminatory power. In addition, the handle method creates a natural grouping definition and its effectiveness does not depend on grouping.
- Integrate quantitative and qualitative elements in a granular way. This is achieved with handle-based metrics. This enables quantification of judgmental assessments across multi-layered customer segments.
- Balance credit access and credit default risk. Model performance is measured from both credit risk and compliance perspectives aided by an optimization process. This process selects optimal thresholds to maximize model predictability for "good versus bad" performance, or to minimize disparate impact on all relative constituencies, subject to a set of constraints that encompass constraints on both regulatory compliance and business requirements.

Uses of the systems and methods disclosed herein can include: Credit scoring model evaluation; Model management; Fair Banking; Marketing optimization; and Fraud detection. Additionally, the model validation systems and methods can include or be used with such technologies as multi-layered segmentation (MLS), dynamic conditional process, (DCP), a hybrid models risk evaluation/policy formulation system (REPFS), and universal performance indicator approach (UPI), which are described as follows: Universal Performance Indicator (UPI) can be used for creating a comprehensive view of compliance and credit risks at different geographic and organizational levels; Dynamic Conditional Process (DCP) can be used for effective compliance testing and credit risk modeling by better utilizing data and emulating business reality; Hybrid Credit Models (HCMs) can be used as an alternative credit risk modeling using either traditional or non-traditional credit information by taking the advantages of both statistical scoring models and judgmental and business criteria; Multi-Layered Segmentation (MLS) can be used for developing integrated segmentation schemes to perform assessment for various segments including neighborhood and under-banked lending/investment; and Credit and Compliance Optimization Process (CCOP) can be used for integrating credit and compliance objectives within the model validation process to achieve optimal business decisions and strategies. These technologies and their uses are described herein and are further discussed in the following document, which is incorporated herein by reference: U.S. Application Ser. No. 61/130,319, (entitled "Computer-Implemented Risk Evaluation And Model Validation Systems And Methods" and filed on May 29, 2008).

BRIEF DESCRIPTION OF THE DRAWINGS

FIG. 3 is a chart depicting a handle example.

FIG. 4 is a chart depicting an example of ranking handle cells.

FIG. 5 is a chart depicting an example of a cohesive handle with inferred risk estimates for statistical testing.

FIG. 6 depicts an example of a scorecard.

FIG. 7 is a chart depicting an action table.

FIG. 10 is a chart depicting cohesive handles with inferred risk estimates.

FIGS. 11A and 11B together comprise a chart depicting a ranking of handle cells.

FIG. 15 illustrates a K-S test for statistical significance of difference in risk distributions across minority status.

FIG. 17 is a chart depicting a comparison of risk distribution between model input and model output.

FIG. 19 depicts a home improvement scorecard override monitoring summary.

FIG. 23 is a chart depicting model risk indicator ranking.

DETAILED DESCRIPTION

Figure 1:
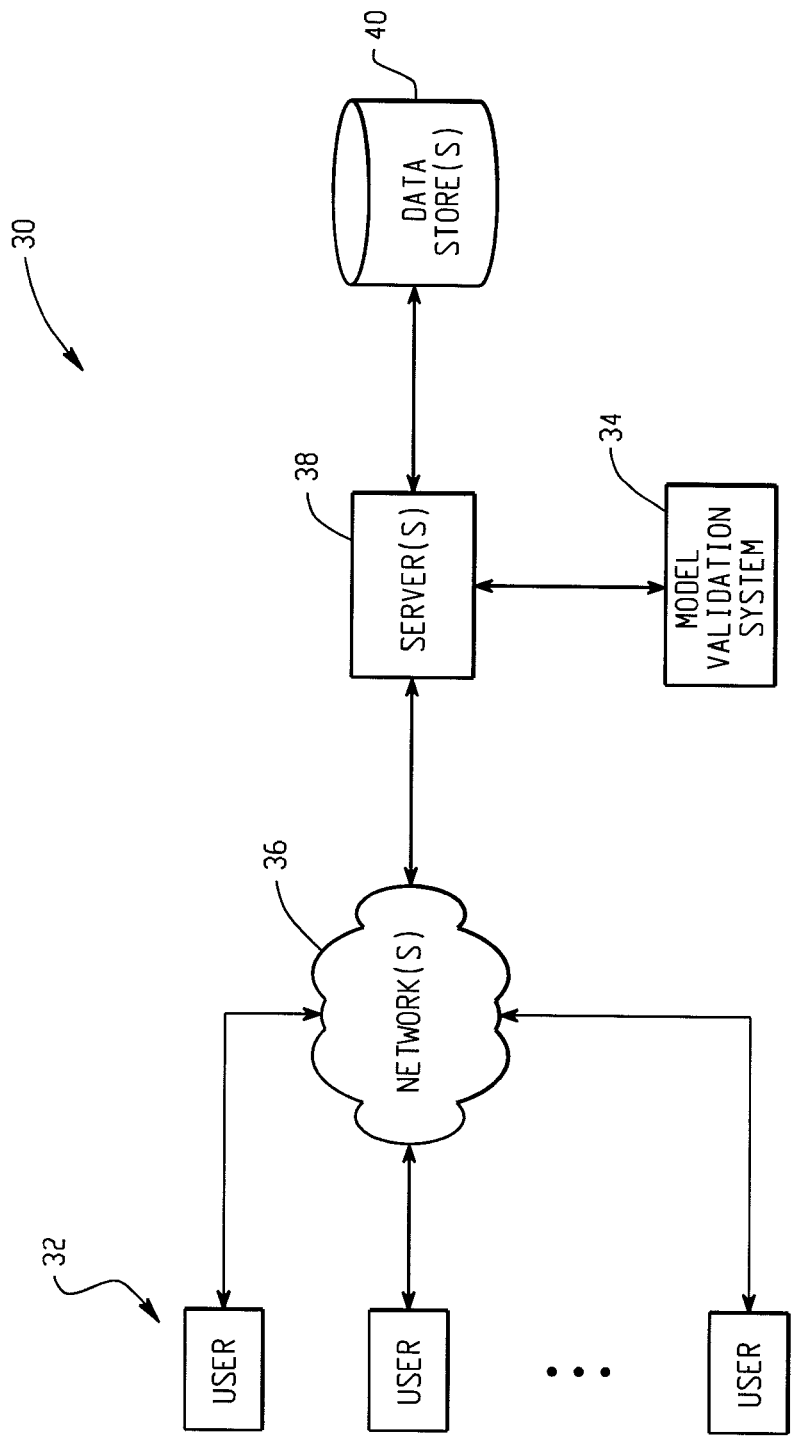
FIG. 1 is a block diagram depicting an environment wherein users can interact with a model validation system to validate credit risk and compliance models.

FIG. 1 depicts at 30 an environment wherein users 32 can interact with a model validation system 34 to validate credit risk and compliance models. The models predict the probability of default associated with a loan transaction. The results of the models are used to determine who to grant credit to and how to price the credit risk in loan transactions.

Because development of the models is a complex process, it is subject to a variety of errors. Business decisions that are based on misuse of models, or inaccurate models, can lead to serious consequences for a lending institution's reputation and profitability. This can be termed "model risk," and it can arise from various sources including model assumptions, inputs, or development processing. The model validation system 34 reduces model risk by reviewing, monitoring, testing and interpreting model inputs, processing, and outputs. The model validating process ensures that expectations for risk measurement and management are satisfied. Model validation can be done as an iterative and continuous process and may be performed throughout the entire model life cycle and upon one or all components, such as model inputs, model processing, and model results.

The users 32 can interact with the model validation system 34 through a number of ways, such as over one or more networks 36. Server(s) 38 accessible through the network(s) 36 can host the system 34. One or more data stores 40 can store the data to be analyzed by the system 34 as well as any intermediate or final data generated by the system 34.

Figure 2:
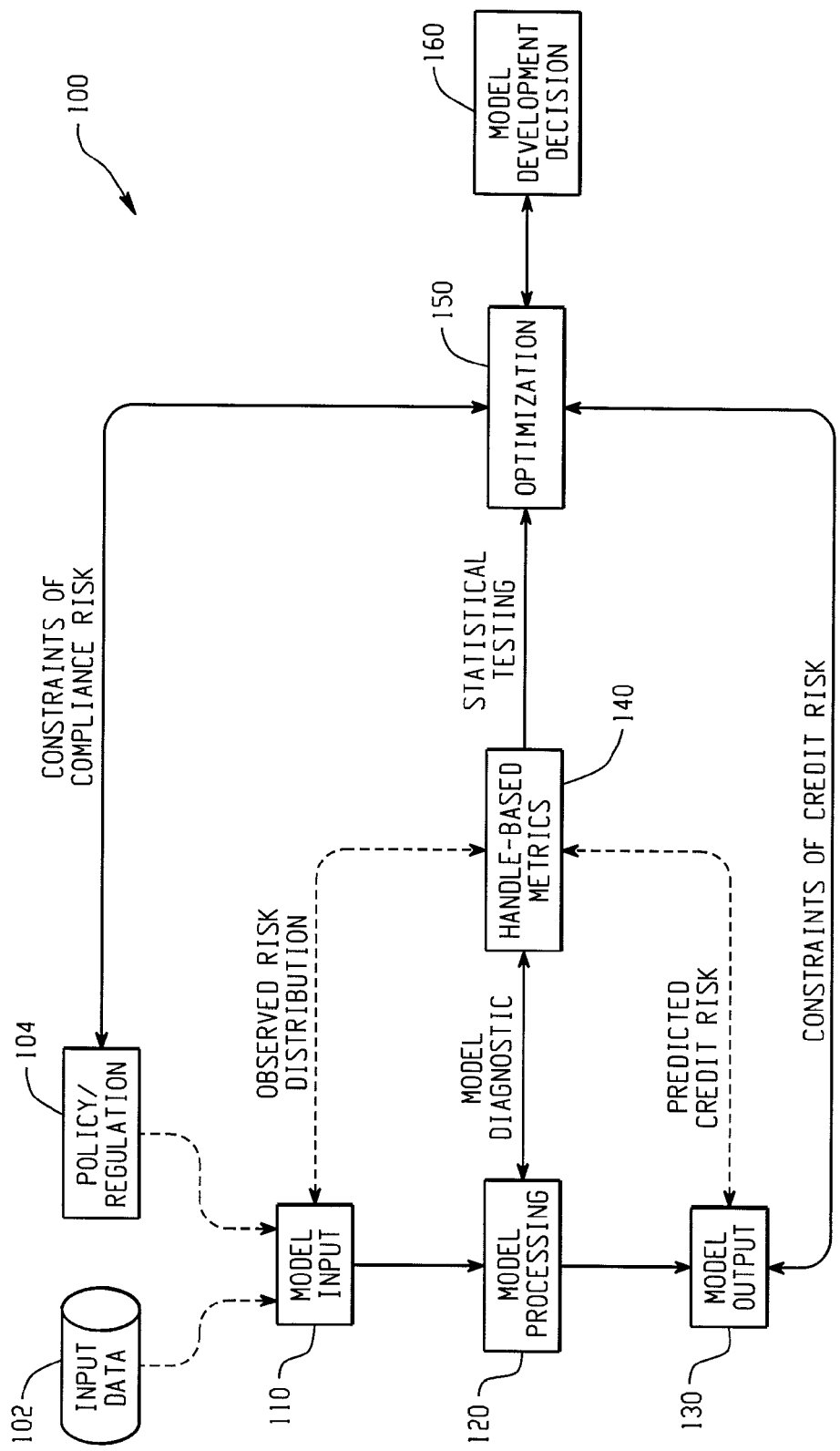
FIG. 2 is a block diagram depicting an example of a model validation system.

FIG. 2 depicts at 100 an example of a model validation system which addresses model risk from both qualitative and quantitative perspectives for all relevant model validation areas (e.g., model input 110, model processing 120, and model output 130) in an integrated and optimized fashion. As an illustration of the different model validation areas, the following table contains several of the topics that could arise in a particular validation area:

| Validation Area | Validation Components | Related Topics |
| --- | --- | --- |
| Inputs | 1) Input assumptions<br>2) Input data<br>3) Lending Policies & Practices | Appropriateness of assumptions<br>Sample size, selection method, and timeframe<br>Data availability and quality<br>Differing business practices and inconsistent application of policies by lenders |
| Processing | 1. Model development<br>2. Model selection<br>3. Model implementation | Discretization<br>Model usage<br>Model estimate methods<br>Reject inference<br>Colinearity<br>Model selection criteria<br>Model algorithms and computation |
| Output | 1. Model result interpretation<br>2. Holdout Sample Testing<br>3. Performance monitoring and reporting | Model fit and estimates<br>Model risk ranking<br>Benchmarking<br>Regulatory constraints |

The model validation system 100 connects the different model validation areas (110, 120, and 130) with unified metrics 140 (handles) to facilitate validation processing and enhance efficiency and interpretability. A handle represents all possible combinations of covariate patterns and describes the joint distribution of risk characteristics. Handle cells include subjective assessments (qualitative aspects) of business scenarios based upon corporate policy, consensus of expert opinion, or compliance requirements.

Each handle cell represents a homogeneous segment in terms of risk, performance, choice behavior, etc. The handle method captures population risk profile in model input data that is represented and evaluated in terms of handle cell distribution (see FIG. 3 at 200). The model predicted risk score (e.g., probability of default) is associated with model input risk profile by handle number (see FIG. 4 at 300). This allows a direct comparison between the observed risk in input data and the predicted risk in model outputs. The residual between the predicted risk score and the input risk distribution (or profile) are further analyzed for root causes (See FIG. 5 at 400). (See FIGS. 6 and 7 for examples of a scorecard 500 and an action table 600.)

The approach of handle-based metrics 140 allows specific treatment of data segments. Unlike a K-S test, which takes no specific consideration of different segments, a handle allows to embed class priors by utilizing different thresholds and business policy. This, to a certain degree, overcomes the common weakness associated with the standard validation metrics, and allows more accurate, and explicit, testing of model discriminatory power. In addition, the handle method creates a natural grouping definition and its effectiveness does not depend on binning. For example, in FIG. 5 the handle number represents a natural grouping for a chi-square test.

For validation, model performance is measured from both credit risk and compliance perspectives aided by an optimization process 150. In order to perform optimization, an objective function is constructed based on results from the information associated with the connection of the different model validation areas via the handle-based metrics 140 and from the treatment of data segments via the handle-based metrics approach. The goal is to select optimal thresholds to maximize model predictability for "good versus bad" performance, or to minimize disparate impact on all relative constituencies, subject to a set of constraints that encompass constraints on both regulatory compliance and business requirements. A risk quadrants plot is used to balance the trade-offs between compliance risk and credit risk. The outputs from the optimization process 150 can help banks make decision on model update or rebuilding activities. For example, the mathematical representation of compliance constraints could resemble the following set of inequalities:

$x_{Tjk1} - x_{Cjk1} \leq \epsilon_{ijk1}$, where $i=_T$ denotes treatment group and $i=_C$ denotes control group and i ranges over the number of treatment groups, say 1 to $n_T$ and control groups, say 1 to $n_C$;

j=1, . . . m; k=1, . . . , c;l=1 signifies variable type is acceptance rate where $n=n_T+n_C$ is the number of identifiable protected classes and control groups (relative to race, ethnicity, gender for HMDA data), m is the number of distinct handle cells in the hybrid model, c is the number of alternative risk index cut-off strategies, $x_{ijk1}$ and $x_{ijk1}$ represent the $i^{th}$ protected class, and non-protected class, acceptance rates for the $j^{th}$ handle cell in the $k^{th}$ action table associated with the hybrid model, and $\epsilon_{ijk}$ represents the upper bound on the difference between acceptance rates for protected class i falling within the handle cell j, associated with action table k. In the event more granularity is desired for the definition of similarly situated borrowers than is afforded by the handle, then the subscript "j" can be defined to denote the "similarly situated group j". With the results of the optimization process 150, different model development decisions can be made at 160.

As additional examples of the different model validation areas, the following is provided. In general, model inputs may contain the following main components:

1. Input Assumptions. This is typically related to the following issues:

Assumptions about data and sampling. For example, the prevailing and historical market and economic conditions at the time the model was originally developed implicitly lead to an assumption that the future will resemble those same conditions. How data were sampled poses other concerns, as noted in our earlier discussions about sampling. If there was some selection bias, or failure to capture certain information for a particular segment, the accuracy of model estimates could suffer substantially.

Definition of credit risks. This may vary by product and line of business. However, caution should be exercised to ensure that performance definitions are consistent. This is especially true when models span traditional banking business (prime lending) and consumer finance business (sub prime lending). Sub prime loans do not conform to prime underwriting standards primarily due to adverse information on the borrower's credit report. We believe the sub prime market has yet to establish a standard definition for each grade of sub prime loan. A review of six major players in the sub prime market revealed that, relative to the sub prime factors cited, they had significant variations in business rules relative to these factors for assigning loans to the various grades.

Definition of indeterminate performance behavior. Exclusion of observations falling into this group can have a significant impact on the credit model. It can lead to overstatement of the default risk associated with relatively mild delinquency patterns.

2. Input Data. Since models are developed with historical data, they may not be able to generate consistent results in cases where loan policies and practices were in a state of flux, or if historical environmental factors introduced volatility, or if the applicant population was undergoing significant changes during the period. Specific examples include:

Changes in loan underwriting or pricing policy: Underwriting decision and pricing policy is affected by business and compliance requirements and subject to changes. Any significant changes in policy will have a direct impact on credit models, particularly when one or more primary factors are involved.

Change in economic state: Changes in macro or local economic factors such as the level of interest rates can affect defaults on variable priced loans. For example, a rise in unemployment in an industry sector may disproportionately impact certain consumer or geographic segments. Overall, if the model is based on data drawn during times of economic prosperity, it is entirely likely that the estimated probabilities of default would prove to be understated during times of recession.

Changes in competitive forces in various markets: If a major lender enters the markets of a lender having an existing credit underwriting model developed for those markets, and this occurs after the time that the model was developed and implemented, then the performance of the model may suffer.

Data collection and sampling process: It is important to validate data quality and eliminate or mitigate their impact before the data can be used for model development. For example, missing data and outliers should be examined and gauged for the potential impact on model variables and specifications, and appropriate remedies such as defaults setting or imputing should be implemented. There are various software solutions available that are developed for those purposes. In addition, sampling methods and process need to ensure representative samples of the current population characteristics in an efficient fashion.

Population shift: Credit scoring model performance and effectiveness may diminish as a result of shifts in model inputs, which can include consumers' characteristics and economic conditions. For a recent population shift, it is important to measure changes in borrowers' characteristics for current and recent applicants relative to applicants two years old in the development sampling timeframe, particularly when one or more primary factors are involved. There are many statistics that can be used to evaluate the relevance of model input data and assumptions for credit risk models. Those include indices created to measure a shift or measure the agreement between the development sample and the holdout sample, such as stability indices. Comparisons may be based upon population proportion, or based on event proportion, across a given variable. The larger the index is, the greater the shift as it is assumed that a larger index exceeding a pre-defined threshold usually means the model performance is in question.

3. Lending Policies and Practices

Lending polices and procedures typically vary based on many factors, such a business lines, channels, and geographic markets. In addition, they may vary by loan purpose, lien status, collateral type to name a few. Modelers should account for these differences by either developing or validating separate models for every variation, or by combining models where possible by taking into account any important differences within the model formulation.

When policies and practices are inconsistently applied, or when exceptions occur. An example would be high side overrides that have a higher frequency for a similarly situated protected class of credit applicants.

With respect to model processing validation, model processing validation can involve the following aspects:

1. Model Development. A primary distinction between more traditional approaches, such as credit scoring, and the hybrid approach, is the hybrid approach use of the model consensus session (MCS).

Variable discretization: Model variable discretization presents a difficult problem for credit risk modelers that use the traditional approaches. For a scorecard, these are typically determined via data analysis (e.g., variable binning, covariance analysis, etc.). Scorecard development typically requires modelers to categorize variables by associating groups or ranges of values the variable can take on that possess similarly good/bad odds ratios. This categorization, or binning, of variables must be done with care because different schemes can have very different results due to their impact on interactions with other variables. Binning algorithms do exist to assist modelers, but they must be used with care.

Variable selection: This is another area impacted. Typically, the strength of a particular factor, and its correlation with other factors, governs to a large extent whether it will make its way into the final model. Predictor strength may be measured by the discrete analog of the divergence statistic, which is calculated by the formula $\Sigma_{i=1,n} [(PG_i - Pb_i)*\ln(PG_i/PB_i)]$, where there are "n" sub-classifications associated with the predictor variable in question. An example is provided in the table below with a housing variable that has three such sub-classifications.

TABLE 1

Divergence Calculation for a Model Variable

| Housing | Pct Goods (A) | Pct Bads (B) | Difference (C = A − B)/ 100 | G/B Ratio (D = A/B) | Log$_2$ (Odds) (E = Log$_2$D) | Calculation (C * E) |
|---|---|---|---|---|---|---|
| Own | 60 | 30 | 0.30 | 2/1 | 1 | 0.3 |
| Rent | 30 | 60 | −0.30 | 1/2 | −1 | 0.3 |
| Other | 10 | 10 | 0.0 | 1/1 | 0 | 0 |
| Divergence | | | | | | 0.60 |

We observe that the housing variable has predictive content in the fair range. A general scheme for assessing variable strength is provided in the following table, which summarizes possible divergence-based thresholds relative to candidate predictor variables in a model.

TABLE 2

Predictive Strength Based on Divergence

| Divergence Range | Interpretation |
|---|---|
| 0.000 to 0.024 | worthless |
| 0.025 to 0.890 | fair |
| 0.900 to 0.299 | good |
| 0.300 to 0.599 | strong |
| 0.600 to 0.799 | very strong |
| 0.800 to 2.000 | exceptionally strong |

It should be kept in mind that these ranges apply to variables in isolation and a variable that possesses only fair predictive content in isolation, may afford greater information value in combination with another variable where there a strong interaction exists. For scoring systems, variable selection is usually performed using a stepwise forward selection method where variables are added at every step and the weights are adjusted until maximum separation is achieved. In addition to separation, a penalty cost for misclassification can be added to the objective function, or profitability expression, and so on. Algorithms can also vary by method, and include non-linear optimization, linear and mixed integer programming, goal programming, stochastic optimization or, conjugate gradient methods. The MCS reduces the complexity introduced by advanced algorithms and can be avoided with the hybrid modeling approach.

Model estimation methods: This involves model theory and algorithms. There are many options available for deriving the weights for variables in a model. Among the many algorithms, none is best suited for all problems since picking an estimation method requires judgment and subject matter knowledge.

Model specifications: Typically, formulating model specifications can be a complicated process and involves various model selection methods such as stepwise, backward, or forward selections, particularly when there are a large number of variables to consider. If hybrid models are used, then the application of DCP is immediate, with little or no need for a MCS to gather specifications. An abbreviated MCS could be performed for the purpose of confirmation of the hybrid model. Impact on protected classes is addressed after the fact via independent compliance testing, most commonly using logistic regression analysis.

Reject inference: With traditional methods, this is normally addressed by a procedure that fractionally assigns declined applicants to good and bad groups based upon the observed correlation of their characteristics with default outcomes based upon observations of approved applicants. A problem occurs when the unknown group is dissimilar from the known group, or when there is additional information concerning the creditworthiness of the unknown group that is not taken into account. In those cases, it is likely that the riskiness of the declined applicants will be overstated.

2. Model selection: With traditional models, model choice can also include "palatability tests," but it is typically governed by predictive capability and misclassification error rate. So if the number of inquiries at the credit bureau is found to be predictive, then number of inquiries may become a model predictor variable. In this case, the fact that someone is shopping for a loan is considered a default risk factor and it lowers their credit score. In the case of logistic regression, the McFadden $R^2$ is often used to measure model strength and model fit is typically measured using the Hosmer-Lemeshow goodness-of-fit statistic. The Kullback Divergence Statistic is often used to measure the predictive power of a scoring system, and values in the neighborhood of one or greater have been shown to separate creditworthy and non-creditworthy credit applicants at a statistically significant rate. One can also compare good and bad score distributions via a test of equality of means.

3. Model Implementation: Even when correct models are developed and selected, model implementation may still experience various problems. This is termed model "implementation risk", which can be caused by many different factors including software programming, solution algorithms, computation efficiency, or hardware issues. As model complicated models are used, there is greater probability and severity of model risk. Using MCS is a way to minimize model implementation risk.

With respect to model output validation, model output validation includes checking both model performance and compliance against expectations and requirements. Typically, model output validation involves several aspects. First, we need to select appropriate testing approaches. Data availability plays a role. Validating a credit risk model requires a large database with sufficient historical data and bad loans. Some testing processes, such as back-testing, can be difficult because of insufficient history for time series data. As a result, the ability to back test credit risk models can be more limited than it is for market risk models. One suggested remedy to overcome the insufficient data issue for commercial credit risk models is cross-sectional simulation. Re-sampling approaches, such as bootstrap and jackknife, are also used to overcome data issues. However, changes in risk factors can not be fully captured in the re-sampling process. This challenge leads to alternative evaluation methods such as scenario simulation, or stress testing. Simulation analysis can be used to evaluate model performance and stability in various scenarios based on predictions regarding the vintage life-cycle, changing credit quality, seasonality, management action, the macroeconomic environment, and the competitive environment.

Second, we need to test model outcomes. Validation on a holdout sample at development time is a standard practice. Holdout sample analysis can be in-time, and out-of-time, analysis. For holdout sample comparisons, one can compare the respective good and bad score distributions via a test of equality of means, or compare acceptance rates for good and bad performance groups between the development and holdout samples, respectively. A direct test of the difference in divergence for the two samples can also be performed. Goodness-of-fit on a holdout sample tests to ensure a model will replicate and that it has avoided capturing noise in the data as predictive information value. Models that are strong predictors on the development sample, but fail to perform well on a holdout sample typically have been subjected to over-fitting. Hybrid models have a distinct advantage in these instances, because a log-linear model can be fit to both the development and validation samples and individual terms can be isolated that account for any differences. This provides an explicit mechanism for dampening noise in the observed data.

Third, we need to interpret model outcomes. Model performance compliance validation requires examining and interpreting model results from regulatory perspective. For example, one can check model outputs against policy, rules, or regulatory requirements. Analysis of model estimated coefficients can be used to identify possible disparate treatment. Override analysis results also can be used this purpose It is noted that credit risk models can be developed with different qualitative or quantitative prediction tools and approaches. There are also numerous statistical metrics to measure performance of those tools. Deciding which model validation metrics are appropriate to use depends on the modeling approaches used, and the purposes and expected performance of models. For credit scoring models, discriminant analysis (DA) is the classic modeling technique. Currently, the most commonly used validation metrics are the ROC, the K-S test, Chi-square test, and the Gini approach. The following table provides a summary of uses and pros and cons for some common statistical measures. This is by no means a complete list.

TABLE 3

Summary of Typical Statistical Measures

| Statistic Measure | Typical Applications | Pros & cons |
|---|---|---|
| Kolmogrov-Smirnov (K-S) Test | Model performance, model input data | Test results may not depend on bucketing or binning. Can measure absolute different between two distributions for continuous distribution only Cannot be used for predictive modeling |
| ROC curve | Model performance comparison | Can incorporate misclassification costs For rank ordering so it deals with relative classifications May underestimate risk even a good ROC coefficient Sensitive to class distribution. Not adequate for rare event class |
| Gini Coefficient | Model performance Model comparison | Convenient and easy for comparing shapes of distributions Does not consider the class relative sizes Cannot incorporate misclassification cost and does not differentiate error types Limited to rank ordering |
| Cumulative Gains Charts and Lift | Population shift Model comparison | Good for making visual comparisons Simple to use and easy to interpret Test results depend on bucketing or binning. |
| Chi-square Statistic | Model performance Model comparison | Test results depends on binning Insensitive to class distribution Assume independence of data Considers all deviation the same weight Can underestimate the true type I error given low frequency of default events Compare actual with expected results |

We now review the metrics in the order in which they appear in this table:

The Kolmogrov-Smirnov test (K-S test). The K-S test is used to measure model segmentation and classification capability. It is widely used in credit scoring analysis to test if data has changed significantly since the model was built. It can be used to test if two groups of data (independent variables) differ significantly. The greatest discrepancy between the observed and expected cumulative frequencies is called the "D-statistic". The K-S test makes no assumption about the distribution of the data and the test statistic D is not affected by using different scales such as log. So it is generally more robust than the t test. K-S test is limited only for testing data against a continuous distribution for a one-dimensional data sample.

Receiver Operation Characteristic Curve (ROC). A ROC curve is a graphical representation of the trade off between the false negative and false positive rates for every possible cut off. Equivalently, the ROC curve is the representation of the tradeoffs between sensitivity (Sn) and specificity (Sp). Here sensitivity is the proportion of correctly classified defaults, or the true positive rate, and specificity is the proportion of correctly classified non-defaults. Therefore, 1—sensitivity is false negative rate (type II error), and accordingly, 1—specificity is false positive rate (type I error). In general, the plot shows the false positive rate on the X axis and 1—the false negative rate on the Y axis. A model with a low type II error rate, or a high probability of rejecting a default, is considered powerful.

Gini Coefficient. Gini curve, or Lorenz curve, is a graphical representation of the cumulative percent captured response curve. The Gini coefficient is defined as a ratio of the areas on the Lorenz curve diagram. Gini coefficient does not differentiate false positive error from false negative errors. This can be significant disadvantage since in practice, banks normally treat type I errors differently from type II errors.

Cumulative Gains Charts and Lift. This is a measure of the effectiveness of a predictive model calculated as the ratio between the results obtained with and without the predictive model. Cumulative gains and lift charts are good visual aids for measuring model performance. Both charts consist of a lift curve and a baseline. The greater the area between the lift curve and the baseline, the better is the model. This measure is extensively used to evaluate model performance.

Chi-square test. Chi square is a widely used non-parametric test of statistical significance that can be applied to any univariate distribution. It measures how a random sample deviates from a given probability distribution function using $\Sigma(O-E)^2/E$. The chi-square test is an alternative to K-S goodness-of-fit tests and applied to binned data. So, the value of the chi-square test statistic can be affected by how the data is binned. Chi-square test can underestimate the true type I error given low frequency of default events. The chi-square test also requires a sufficient sample size to generate a valid chi-square approximation.

The above standard statistical methods face some challenges when applied to credit scoring model validation as shown in the above table. First, the K-S statistic or Gini coefficient may have some inherent limitations. According to Hand (2001), all of these suffer from one common weakness—they are based on a comparison of the predicted probability belonging to either good or bad, which represent a distorted sample of the total population. Thus, the developed models are likely to perform poorly on new applicants. These methods measure the model's ability to rank risk throughout the entire sample without giving any special weight to performance near the accept/reject region. The Gini coefficient, the K-S statistic, and the information value do not take account of the class priors. It has been argued that using K-S test, ROC curve or Gini-coefficient as model validation measures can be misleading since they rely on a single threshold instead of the entire performance distribution.

Another challenge is the group definition, which is one of the most severe problems associated with discriminant analysis. To develop robust scoring models, data should be grouped by natural breaks to preserve the variable predictive information, and this has been a persistent issue in practice.

We see another challenge, namely the statistics described in the above table are based on individual tests. Since credit model development and underwriting processes always involve multiple factors, it would be difficult to determine if those individual changes are significant enough to affect underwriting policy or model specifications. All those different metrics may measure credit risks from different perspectives, and no single metric is statistically powerful and robust enough to be sufficient. Often, multiple metrics are required to confirm validation results. However, multiple measures also can result in conflicting ranking and results.

We note that all of those methods are purely statistical and quantitative metrics. Model validation criteria can be not based on a single quantitative metric, and a quantitative metric should be complemented with qualitative elements. Therefore, judgmental factors such as business and regulatory requirements can be integrated into the process to validate models from both credit risk and compliance risk aspects.

Figure 8:
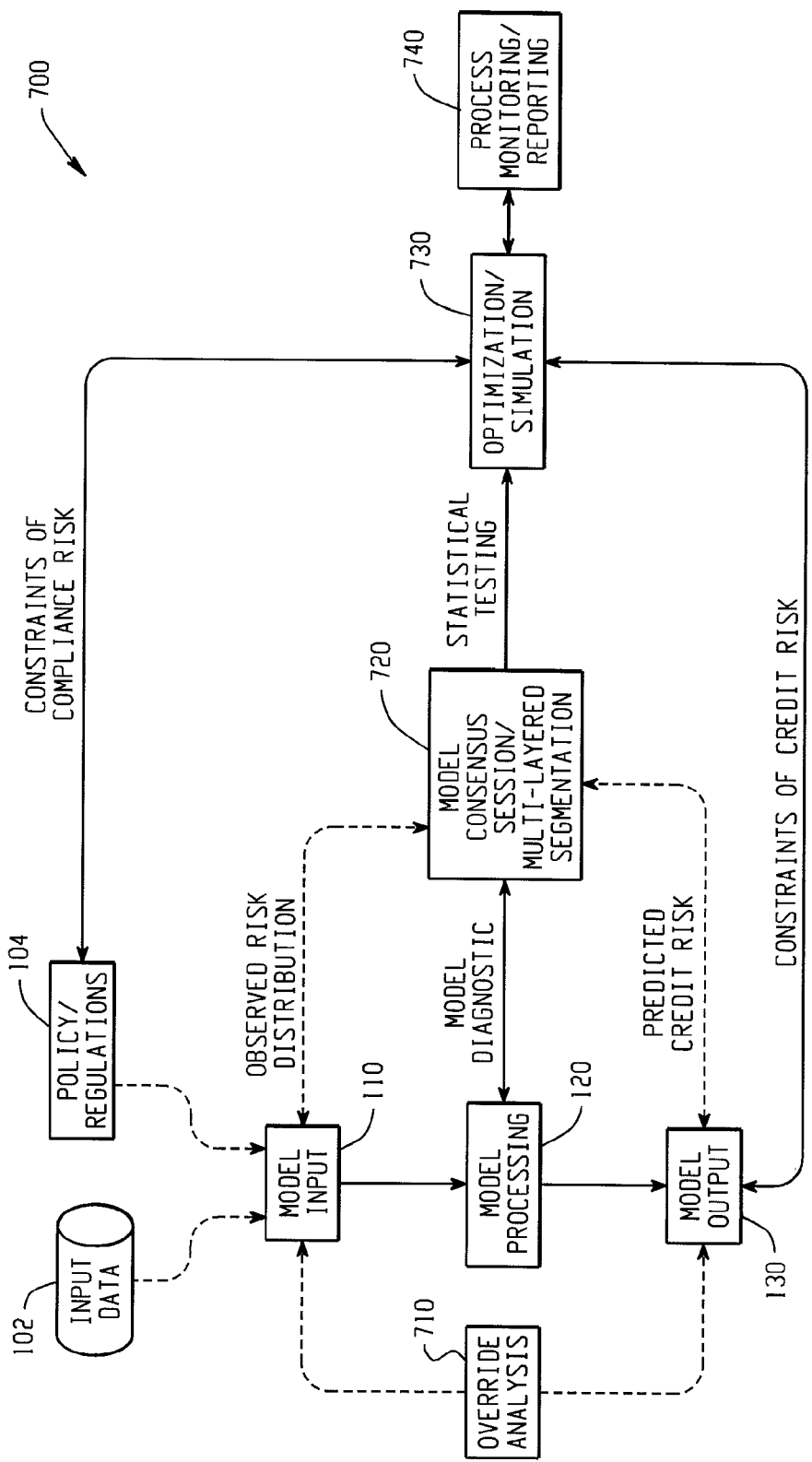
FIG. 8 is a block diagram depicting another model validation system.

As an illustration of another approach for handling the three main validation areas, FIG. 8 depicts at 700 a model validation system wherein the validation areas (input 110, process 120, and output 130) are integrated though a handle approach. First at process 720, the population risk profile in model input data is represented and evaluated in terms of handle cell distribution with multi-layered segmentation (MLS). Population shifts and changes in risk profile are further examined across different protected groups and time points. Then models are developed through an efficient model consensus session (MCS) to ensure appropriate model evaluation, specifications, and selection. Finally, the model predicted probability of default is associated with model input risk profile by the handle number. This allows a direct comparison between the observed risk in input data and the predicted risk in model outputs. The residual between the predicted risk score and the input risk distribution (or profile) is further analyzed for root causes.

Depending on the degree of override incidence, an override process 710 can integrate override analysis results into the model validation process. On the one hand, the override process 710 can be monitored by matching override incidence to handle cells. On the other hand, the override analysis results are used as feedback and integrated into MLS process at 720 to facilitate handle creation and model performance evaluation.

The model validation system 700 also uses a validation optimization process 730 and a monitor and reporting process 740. The validation optimization process 730 considers two concurrent objectives. It needs to maximize the separation of creditworthy and non-creditworthy applications, while also minimizing the disparate impact to ensure comparable acceptance rate, pricing, and terms related to similarly situated protected and non-protected class borrowers. This is facilitated by adapting an initial feasible model specification through MCS.

The monitor and reporting process 740 monitors, measures, and ranks models jointly by performance and compliance risk. This process integrates various model disparity indices derived from metrics from or outside this validation framework. A universal performance indicator (UPI) methodology can be used to combine both compliance and credit risk into a single risk ranking indicator.

Figure 9:
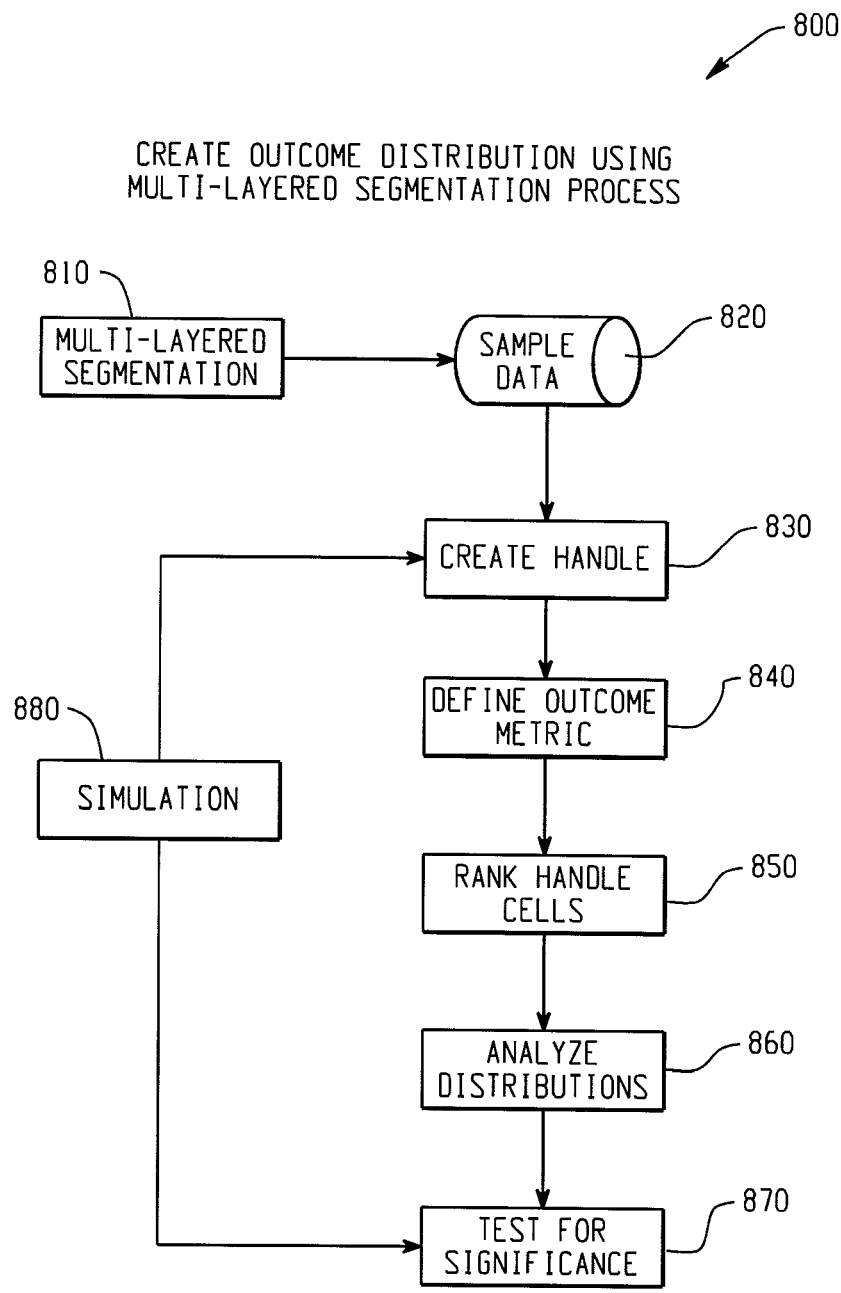
FIG. 9 is a block diagram depicting a multi-layered segmentation process.

FIG. 9 illustrates at 800 an operational scenario involving the multi-layered segmentation approach 810 of process 720 (in FIG. 8). Based upon sample data 820, the process creates at 830 a handle, which represents all possible combinations of covariate patterns and describes the joint distribution of risk characteristics. Within each handle segment, applicants are considered more or less homogeneous in terms of default risk. A handle-based distribution offers several advantages. First, it allows specific treatment of data segments. Unlike a K-S test, which takes no specific consideration of different segments, a handle allows to embed class priors by utilizing different thresholds and business policy. This, to a certain degree, overcomes the common weakness associated with the standard validation metrics as described earlier, and allows more accurate, and explicit, testing of model discriminatory power. Second, a handle creates a natural grouping definition and its effectiveness does not depend on binning. The number of classes depends on the number of handle cells. In the case of logistic regression, each handle cell represents a unique segment and a covariate pattern. Within each cell, all observations have the same probability of default. Therefore, a natural binning is by handle, which affords a more consistent measure of risk. This method can be used to overcome the inherent limitation of the Chi-square test, which depends on number of binning classes. Third, it allows intuitive cross-sectional validation. As shown at 900 in FIG. 10, a cohesive handle can be constructed using logical inferences to extrapolate values for segments that have sampling zeros or insufficient data: this helps overcome missing data and is especially powerful for reject inference. MLS provides the means to more effectively manage and validate a large number of models that are made possible with a cohesive handle.

Process 840 defines outcome metric, and process 850 ranks the handle cells. Since each handle represents a unique data attribute and within each group all applications are homogenous and have the same degree of default risk, with past default history, we can use cumulative gains chart to rank order the risk of handle cells. Within each handle segment, we observe the incidence of goods, bads, rejects, and override outcomes. This information is used to calculate the observed default rate. The risk ranking, or distribution, of the handle cells forms a basis for assessing the overall risk profile of the validation sample. (FIGS. 11A and 11B together show at 1000 an example of how handle cells are ranked by the observed default risk.) In addition to default, the handle distribution also can be created based on measures such as profitability, return on investment, and so on.

After the handle cells are ranked, the risk distributions can be analyzed at process 860 and then tested for significance at process 870. This can include for credit risk validation, comparing validation sample against model development sample. Here, the shift in overall risk profile can be captured with a handle distribution explicitly. We perform a Chi-square test with appropriate degrees of freedom, to determine the significance of sample difference. If it is significant, further analysis is required to determine the factors, or their combinations, which contribute to the shift. For compliance validation, we examine for the same sample, the handle distribution by individual protected classes vs. the non-protected class (the control group). Here, the difference between the protected and non-protected distribution can be captured. A significant difference in risk distribution across protected groups may indicate disparate impact or treatment.

Figure 12:
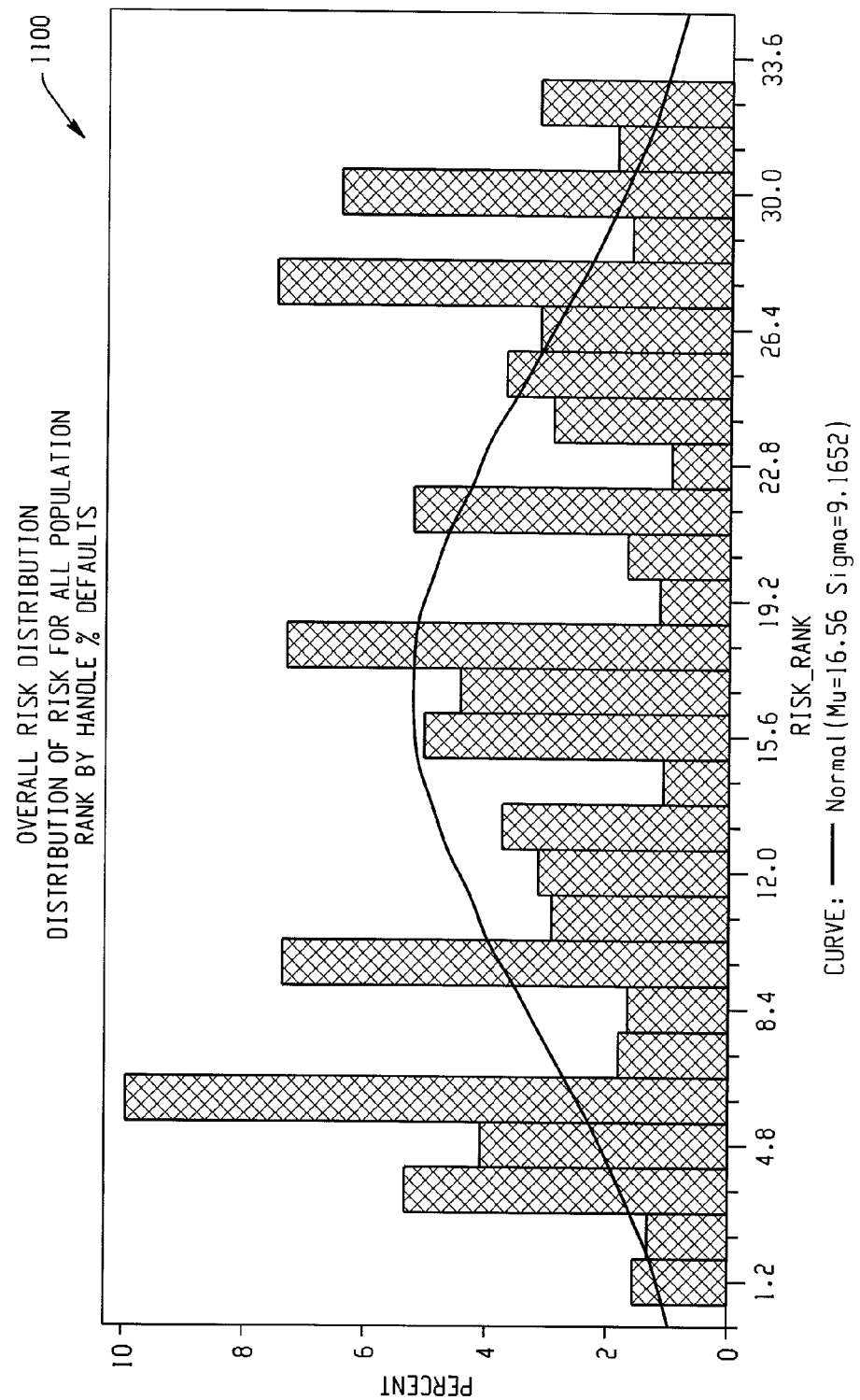
FIG. 12 is a graph depicting overall risk distribution.
Figure 13:
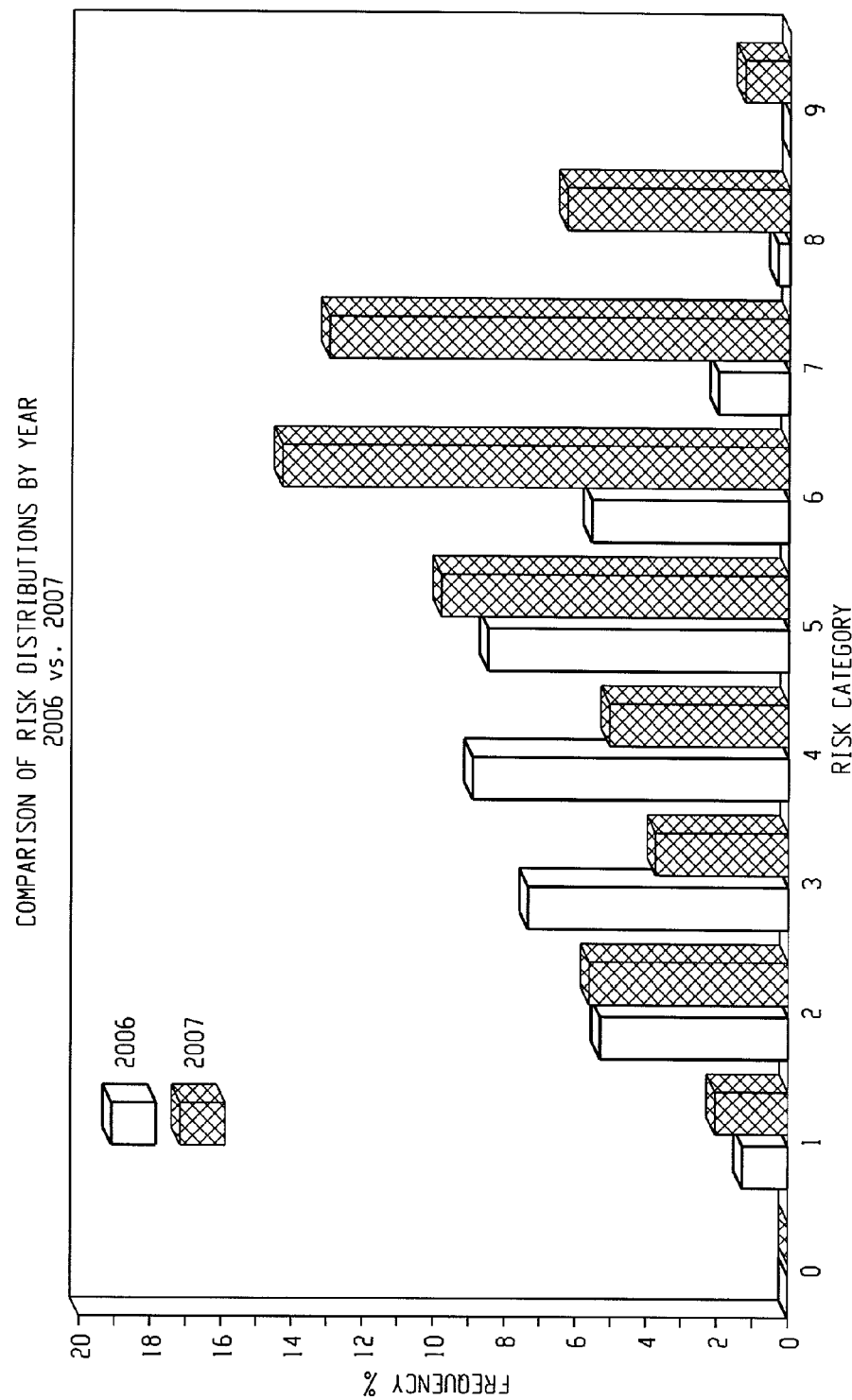
FIG. 13 is a graph depicting a comparison of risk distributions by year.

Simulation 880 can also be performed. For each handle cell, the percentage of default: $C_{ri}$ is calculate and is equal to the total number of defaults/total number of loans. This can be calculated for the overall population as shown in FIG. 12. This also can be done over time for development sample, and validation sample, respectively. FIG. 13 shows an example of comparison of risk simulation distribution over time. This depicts a risk distribution trend corresponding to all credit applicants for an arbitrary loan product. The trend is, on the surface, unsettling at best.

Figure 14:
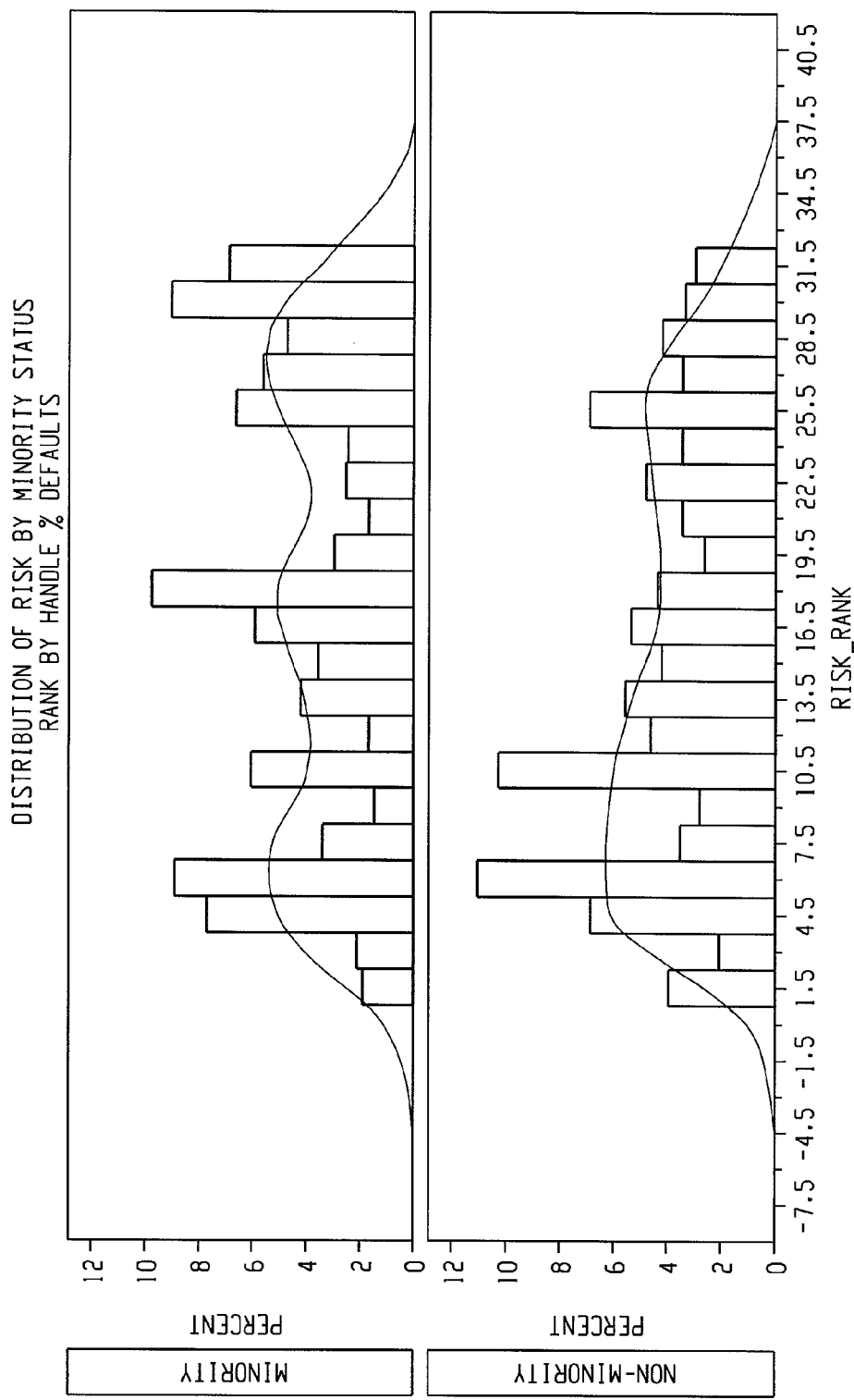
FIG. 14 are graphs depicting distribution of risk by minority status with a rank by handle percentage defaults.

In order to test for compliance. statistical tests such as K-S can be used for testing the significance in risk ranking across different groups, such as race or ethnicity as shown at 1300 in FIG. 14. When there is a significant difference between those two distributions, there is disparate impact, and possibly disparate treatment. K-S test can be used for this purpose as shown at 1400 in FIG. 15. By considering a range of possible simulation thresholds, consistency of the handle risk ranking can be examined across different protected groups versus the control group. A range of thresholds for primary factors can be used to calculate possible outcomes of the handle distribution. The thresholds that generate the best model performance, at varying levels of disparate impact, can be compared and validated against existing policy thresholds. In this way, model sensitivity to the threshold values can be determined relative to both credit risk and compliance risk.

Such processing can be used, for example, in model input validation by enabling the following three activities:
1. Creation of a risk distribution over discrete risk-homogeneous segments that are mutually exclusive and completely capture the essence of the input population of observations relative to the business purpose (e.g., loan underwriting, pricing, marketing, etc.).
2. Test for significance of a shift in the risk distribution using a K-S statistic, the Chi-square test, and so on.
3. Superimpose risk distributions for every protected class, or group of interest, with the corresponding control group to test to see if they are synchronized. Where significant differences exist, MLS points the way to the root cause(s).

Additionally, handle cell risk can be viewed and ranked by different metrics. This affords a more comprehensive yet simple representation that jointly captures the attributes of all input variables simultaneously, versus other statistics such as K-S, Gini coefficient, or T test. It is also easier to interpret and audit because model performance validation results can be traced back to changes in data characteristics. More broadly, a handle associates input data attributes with variable selection, model specification and model performance. In other words, it connects input data validation with model processing validation. As a result, the entire model validation process is more tightly woven and consistent. This approach can be implemented with hybrid models. For non-hybrid models an MCS is recommended to construct the handle, as opposed to pure data-driven approaches, such as picking the variables possessing the highest predictive strength in the scorecard or other base model.

MLS based model input validation can be readily interpreted from compliance perspective. For example, from FIGS. 11A and 11B, the implications are immediate relative to the corresponding loan decline rate trend year-to-year. The real question is "What is driving the shift in risk distribution in the applicant population?" Possible scenarios include that there has been a new significant marketing emphasis, or that the primary risk measurement tool is the credit bureau score which has been, on average, migrating downward over the period. Another question is "Has riskiness of the applicant population truly increased, or is that conclusion based more upon the way risk is measured?" If there had been a large influx of "thin file" applicants who possess excellent non-credit payment histories for rent, utilities, car payments, etc. then the "trend" could be misleading and there may be profitable business that is not being captured. In order to determine the key drivers of the perceived trend, more analysis is required. Of fundamental concern is that the models used to underwrite loans are valid and that they also afford fair access to credit.

Figure 16:
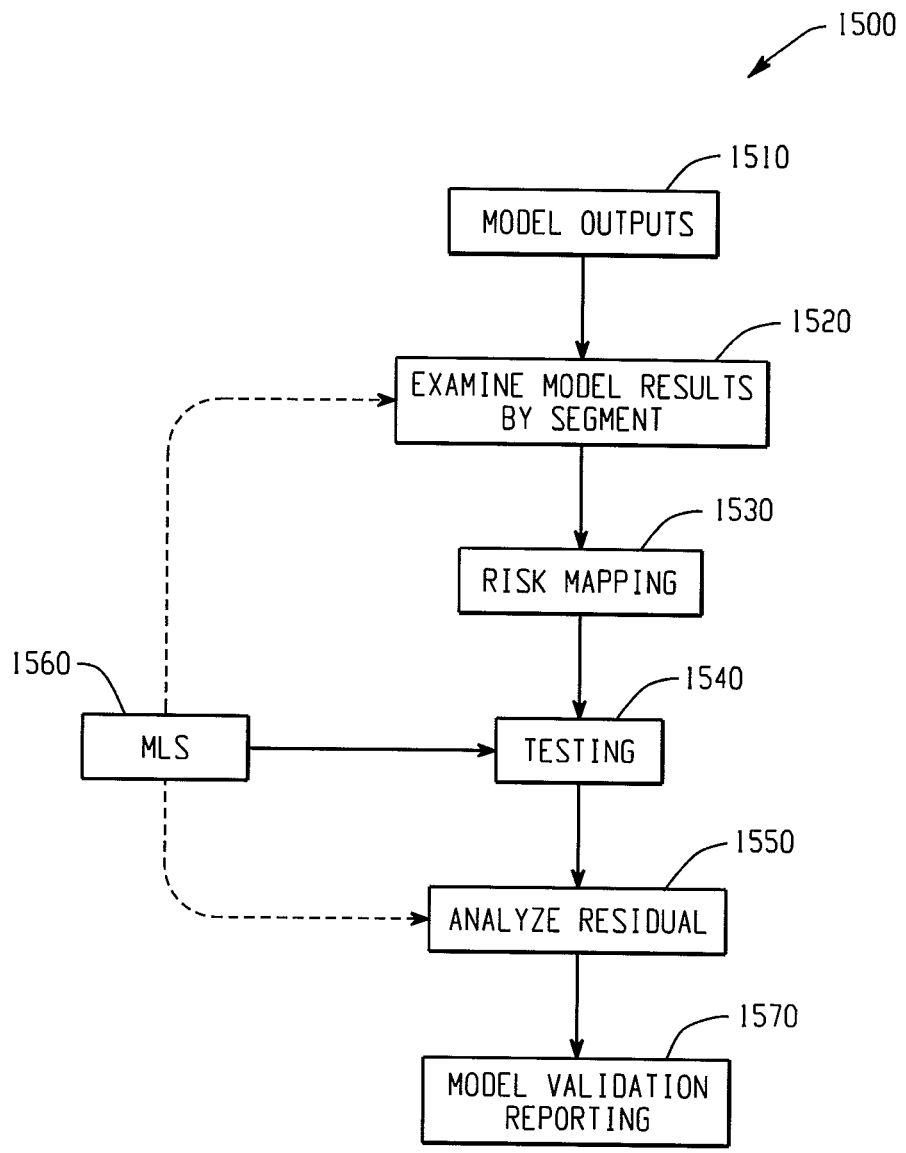
FIG. 16 is a block diagram depicting a multi-layered segmentation (MLS) process.

As discussed above, a model validation system can include a multi-layered segmentation (MLS) approach. MLS provides a dual perspective that empowers modelers with a more complete and accurate validation process for assessing model performance. An example process is depicted in FIG. 16 at 1500.

In this process 1500, model performance validation results are directly associated with a model validation area (e.g., model outputs 1510) via handle cells. This allows direct comparison at 1520 of the observed risk distribution with the predicted risk distribution and easy interpretation of any possible inconsistency. In the case of the hybrid model, the probability of default is identical for all observations within a handle cell and a distribution comparison is readily available. Risk mapping occurs at 1530. FIG. 17 at 1600 illustrates how model output is associated to the model output with handle numbers for the hybrid model and shows a comparison of risk distribution between model input and model output. For a non-hybrid model, each observation may have a unique probability of default within a cell and the group variance is taken into consideration. In this example, there are 5 decision variables and 32 handle cells, which represent 32 unique combinations of covariate patterns.

To compare the risk distributions between the input and the output, a statistical test is conducted at 1540 to determine if the inconsistency or difference is statistical significant. A test can be performed based on either the changes in rank order of the risk distributions, or the residuals, between the observed and predicted probabilities. Various methods, such as K-S test, ANOVA test, Chi-square test, and so on, can be easily performed for this purpose. In case of the chi-square test statistic, we substitute the development sample estimates for the expected counts, and the validation sample estimates for the observed counts. Both model outputs represent "through-the-door" populations, where rejects have been assigned to good and bad performance groups. The residuals are analyzed at 1550 and model validation reporting is performed at 1570.

With respect to validation of model results from credit risk perspective, model performance needs to be regularly validated against actual risk distributions to ascertain if there are any differences in ranking of the MLS cells over time based on loan performance. The Hosmer-Lemeshow chi-square test can be used to test how well the predicted probability of default (PD) matches the actual PD. The predicted PD determines a handle cell relative rank in terms of default risk, while the actual PD can be represented with cell rank in terms of default frequency for that cell. The difference between the predicted rank, and the actual rank, of a handle cell represents the residual that can be used to measure the model performance. Handle cell ranking sensitivity to different thresholds can be assessed for impact on model performance. For example, mean square error (MSE) can be calculated to measure potential model performance based on the difference between the observed risk and the predicted risk for each set of thresholds. In this way, proposed changes to credit policy can be evaluated to identify specific borrower segments impacted and the resulting effect on portfolio risk.

Model performance also needs to be validated against the actual frequency distributions for good, bad, and rejected credit applicants to determine whether or not the three individual structural models, and the combined total applicant (known plus unknown) model, still each apply. This is because models may rank order risk the same, but the magnitude of the estimated loan approvals, or loan losses, may shift over time. One scheme to accomplish this would be to use the development sample for specification of the low order interactions and fit a saturated model based on actual cumulative distributions acquired since model deployment, gathered at periodic intervals, to identify and measure any differences in the higher order effects. If we express the log-likelihood test statistic $G^2=-2*\Sigma_i x_i*\ln(m_i/x_i)$, where the validation sample counts are the $x_i$ and the model estimated counts are the $m_i$. We can expand the expression $G^2=2*\Sigma_i x_i*\ln(x_i)-2*\Sigma_i x_i*\ln(m_i)$ to reveal the first quantity is purely a function of the validation counts, while the second is the kernel of the log-likelihood based on the development sample. $G^2$ measures the goodness of fit between the model and the actual (post-model deployment) observed frequency distributions of good, bad, and rejected applicants relative to the MLS. Furthermore, the likelihood ratio statistic has the nice property that it can be broken down conditionally to test for each individual effect in the model. In symbolic form, this partitioning of the statistic takes the form $G^2(2)=G^2[(2)|(1)]+G^2(1)$, where model (2) contains a subset of the u-terms in model (1) (i.e., they are nested) and $G^2[(2)|(1)]$ represents the conditional log-likelihood ratio statistic for model (2) given model (1). Further, if $G^2(2)$ and $G^2(1)$ are asymptotically distributed as $\chi^2$ with $v_1$ and $v_2$ degrees of freedom, respectively, then $G^2[(2)|(1)]$ is asymptotically distributed as $\chi^2$ with $(v_2-v_1)$ degrees of freedom.

Another aspect of validation is to compare system performance for different consumer segments. For example, the internal cells could be based upon non-mainstream borrowers, while the margins may reflect mainstream borrowers. If alternative data variables are used for non-mainstream borrowers and there is insufficient performance data on the non-traditional applicants then this type of scheme can be useful to assess the relative performance of alternative scorecards. To deal with missing data (typically there are insufficient non-mainstream bads to sample) then a combination of using "similarly situated mainstream bad observations" (e.g., with respect to the MLS structure), we can use the following procedure for removing sampling zeros:

Fit a model "loosely" to the non-traditional data, augmenting with mainstream observations as needed, Use the fitted values obtained in step 1) i.e., $\{y_{ijklm}\}$ (e.g., in a five-dimensional case) to estimate the prior probabilities $\{\lambda_{ijklm}\}$ via the equation $\lambda_{ijklm}=(y_{ijklm}/n)$ where n=sample size. [In order to make the discussion more general, let "θ" denote a subscript set of arbitrary size—in this example so far θ={i,j,l,m}], Compute the weighting factor:

$$\hat{w} = \frac{n^2 - \sum_\theta x_\theta^2}{\sum_\theta (x_\theta - n\lambda_\theta)^2}$$

Where the $x_\theta$'s are the observed cell counts.

Compute the cell estimates:

$$m_\theta^* = np_\theta^* = \frac{n}{n+\hat{w}}(X_\theta + \hat{w}\lambda_\theta)$$

Calculate $G^2$ to compare performance of the model on the non-mainstream borrower group using the estimated frequencies as well as cell counts, i.e., both $p^*_\theta$, and $m^*_\theta$.

With respect to validation of model results from compliance risk perspective, protected class status in the MLS cells is known for HMDA reportable loans. The entire handle distribution can be compared between protected class and their non-protected class counterparts via a log-likelihood test statistic $G^2=2*\Sigma_i x_i*\ln(m_i/x_i)$. Significant differences point to factors that can explain disparate impact patterns. It is a straightforward exercise to examine acceptee population mix or acceptance rates for each individual protected group, with respect to the MLS, and any subset, or cross combination of dimensions, that make it up. For example a significant result may lead to the identification of two three-way patterns and three two-way patterns of interaction that account for a difference in loan originations for a particular group, such as African-American credit applicants, relative to their white non-Hispanic counterparts (control group). Finally, one can measure the impact of proposed policy threshold changes on fair lending performance. This is accomplished by varying the threshold amounts within pre-specified ranges and then measuring how the handle distribution changes for individual groups using a chi-square statistic. Outcomes can be decisioned with the updated action tables and the corresponding multi-dimensional acceptance rate tables can be generated and compared to find specific multi-way interaction differences relative to the control group.

Figure 18:
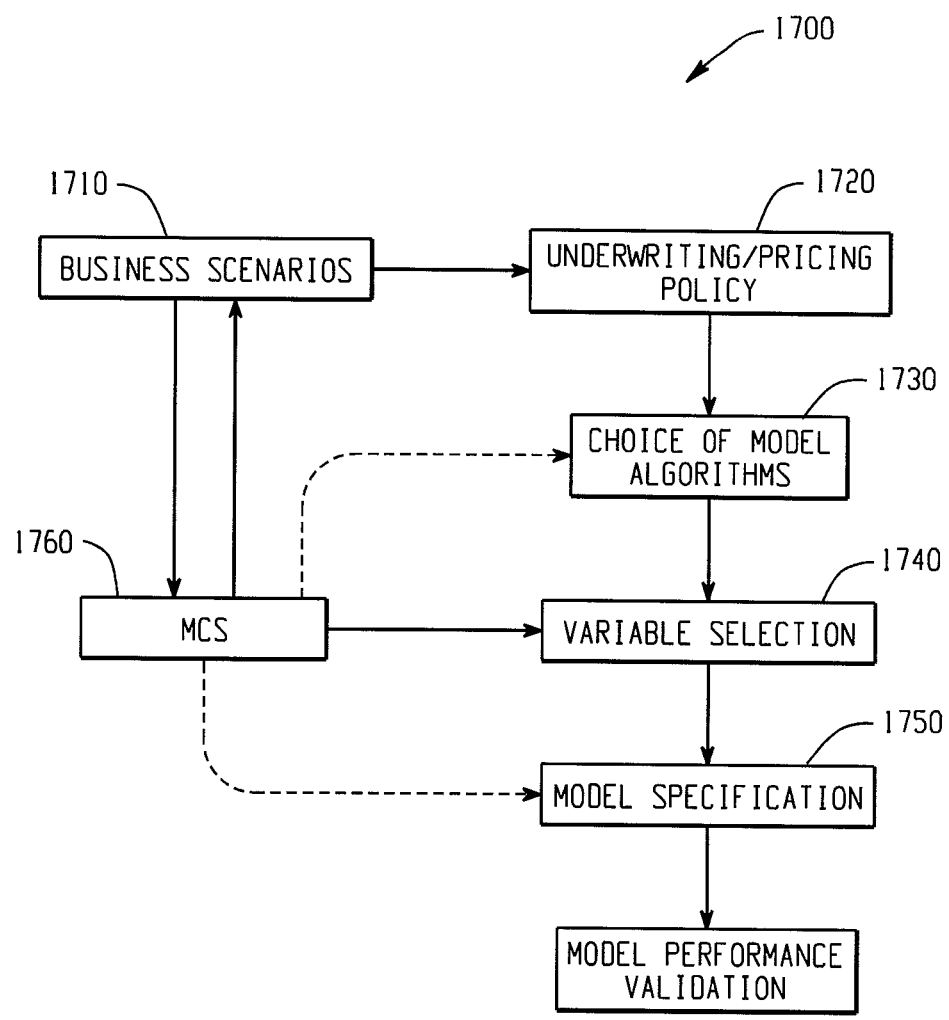
FIG. 18 is a block diagram depicting a model consensus session (MCS) process.

As discussed above (e.g., with respect to process 720 in FIG. 8), a model validation system can include a model consensus session (MCS) approach. For example, hybrid models can utilize an efficient MCS approach to control and manage model specifications. MCS determines which primary and secondary factors to include in the model, the conditions when to include secondary factors, and the interactions between or among them. The MCS process can be used to validate model processing. FIG. 18 provides at 1700 an example of how this process can be performed. In the model development process, variable selection is governed by business reality (e.g., business scenarios 1710). Credit experts possessing deep knowledge of industry and secondary market models, and also specific experience with the lending institution in question, form a consensus view in an MCS on primary and secondary model variables. Hence, variables that do not affect underwriting, or pricing, decisions are not included in the models. This is the application of MCS 1760 to developing the hybrid models.

Credit risk models are developed based on certain assumptions, such as assumptions about the model usage and possible adaptability or use for other purposes. For example, the model is developed for credit underwriting (e.g., as shown at 1720) based on data from a particular region and then is applied to a different region with a different approval threshold or perhaps is used to estimate probability of default at the account, rather than segment, level for portfolio loss forecasting. Process 1730 involves choice of model algorithms to use, and process 1740 involves selection of variables.

With respect to variables and their categorization, for a hybrid model, this categorization process is largely determined by credit policy guidelines and the MCS. Hybrid models can also be tested for the significance of individual interactions by successively fitting nested models that differ only in one term, namely the interaction of interest. The statistical significance of the individual interaction term can be determined. Variable interactions and thresholds are determined differently based upon the type of model.

Key variables are classified as primary variables, and they are selected (e.g., by process 1740) so that each of them measures the unique characteristics of the credit data. For example, credit history (captures past willingness and ability to pay obligations as agreed), loan to value ratio (LTV) (provides borrower capital and collateral value considerations), debt to income ratio (DTI) (provides borrower capacity and indebtedness information), and so on.

Other variables are classified into secondary factors. Some of the secondary variables (e.g., payment shock in mortgage lending) may potentially measure the similar things as some of the primary variables (e.g., debt ratio or payment to income ratio) and therefore may be correlated with them. However, a secondary variable only come into play when the primary variables are weak or missing. This further reduces the effects of collinearity The variable selection process at 1740, governed by business reality, makes validation of model specifications 1750 straight-forward. In regression analysis, model misspecifications are often related to collinearity, which occurs when two or more input variables are strongly correlated. Collinearity can inflate the variances of the parameter estimates when the analysis involves small and moderate sample sizes. Collinearity may also result in wrong signs and magnitudes of regression coefficient estimates, and consequently in incorrect conclusions about relationships between independent and dependent variables. To deal with collinearity, one needs to identify the causes and remove the effects. There are many remedial methods available for this process, such as Bayesian techniques, robust estimation, and principal component analysis. The MCS approach 1760 minimizes model misspecifications and reduces the impact of collinearity by incorporating judgmental elements to create and use new variables. In some circumstances, new variables are created to capture the interaction and conditions between/among input variables. In some instances, neither of the variables in question appears in the model. For example, a new interaction variable can be created to capture the degree of risk that is jointly determined by a primary factor and secondary factor. For example, in a direct auto lending example, we could define a variable that has a value of one if the term of the loan is grater than 60 months and the vehicle is used, and zero otherwise. That interaction variable could be included in the handle without including either loan term or age of vehicle.

In cases where the prevailing system is not a hybrid system, an MCS is beneficial. It enables the development of a handle, or segmentation. Using the handle, reject inference can be more effectively addressed via application of a DCP approach to capture the approve/decline mechanism, coupled with the use of the handle to view homogeneous risk groups to assign rejected applicants to good and bad performance groups. If the prevailing system is a hybrid system, there is no data to base reject inference on, with the possible exception of overrides. It is suggested that customer segments that are close in proximity to the minimum acceptable credit risk be selected on a random basis for controlled experimentation to determine if there is opportunity to open up additional segments for credit under possibly different terms and pricing to compensate for additional risk.

With respect to the model selection at process 1730, once the model is constructed and tested, there may be opportunities for refinement where data provide some more detailed insight into the strength and interplay of model variables. With the hybrid approach, model selection is largely performed in the MCS, while with a non-hybrid model, the MCS is performed prior to model selection. Any changes to specification relating to the choice of primary and secondary factors would need to be validated via a follow-up with MCS participants. This is true for modeling the current approve/decline decision, as well as for improving god/bad performance prediction. For example, even if the color of a car was available and predictive of performance (say owners of red cars tended to default at greater rates than owners of cars painted other colors), a model having color of auto as a predictor variable would not be used because it does not bear any linkage to a borrower's ability or willingness to repay the loan.

With respect to selection criteria at process 1740, there are various criteria that are used in practice. For hybrid models, the MCS determines the primary and secondary model variables, their conditional structure, and how they interact within various segments. The remaining work is one of quantification of the MCS specified model. Naturally, a typical measure of predictive validity is the misclassification error rate for goods and bads. An aspect of the quantification of the MCS model is the detail around how to assess and quantify the specified interactions among the MCS primary and secondary variables. In the case of the primary variables, one must fit models to the sampled data to construct structural models for good, bad, and reject applicant populations. This entails the use of a statistic that is asymptotically distributed as a central Chi-Square ($\chi^2$).

As an illustration, we provide the following example for hybrid models. The appropriate measure of goodness of fit of the model here is the likelihood-ratio statistic $G^2 = -2 * \Sigma_i x_i * \ln(m_i/x_i)$ with the number of degrees of freedom appropriate to the set of $\{m_i\}$, where $x_i$ are the observed values in the $i^{th}$ cell, and the $m_i$ are the maximum likelihood estimates, or the fitted values in the $i^{th}$ cell. Results from a high dimensional parameterization of the sampled data indicated the following model would be appropriate for an initial hypothesis as to the structure of the bad risks $$\ln(m_{ijklmn}) = U + U_{2356}(jkmn) + U_{123}(ijk) + U_4(l)$$

The value of the Likelihood Ratio Statistic was 20.3295. Next, three other models were tested with the following results;

| Effects Present | Net Gain | Alpha Level |
| --- | --- | --- |
| 235, 236, 256, 356, 123, 4. | 7.0999 | .3720 |
| 235, 256, 123, 4. | 2.9457 | .4303 |
| 236, 123, 35, 4. | 3.6236 | .0112 |

The simplest model which does not exclude terms found to be significant was found to be:

$$\ln(m_{ijklmn}) = U + U_{236}(jkn) + U_{256}(jmn) + U_{123}(ijk) + U_4(l)$$

This example shows that the MCS can reveal what variables are of primary importance. The fitting of a structural model is an exercise to capture important interactions between those predictor variables so that the most powerful and reliable risk estimates for loan performance can be derived.

As discussed above (e.g., with respect to process 710 in FIG. 8), a model validation system can include override analysis. In general, there are various situations where legitimate credit exceptions are made based upon additional information outside of the model's credit risk boundaries. It is generally acknowledged that some system overrides are unavoidable. Since override analysis is most commonly used in conjunction with credit scored loans, concerns relative to disparate impact usually center on potential discriminatory aspects of particular scorecards characteristics. For example, scoring whether or not someone had a phone in their name would be a violation of Equal Credit Opportunity Act (ECOA). Finance company reference is another characteristic that may have greater correlation with inner city populations that, because of where they live, they have less access to bank branches than they do to sub-prime lenders. Those areas are most likely low income areas and often have a high percentage of minority households. Hence, factors which appear to have a significant negative impact on a protected class of credit applicants should be fully assessed, and alternative factors should be sought that have predictive power, but are non-discriminatory in nature.

Disparate treatment poses a far greater compliance risk to lenders using scoring systems. The risk is twofold. First is the risk that the scoring system itself is discriminatory, that is, similarly qualified borrowers who fall into protected, versus non-protected classes, may score lower because one or more scoring factors has a biased estimate of their creditworthiness. Under the Effects Test of the ECOA, a plaintiff can win the case for discrimination if it can be demonstrated that another scoring system exists which is equally predictive of creditworthiness and treats the protected classes more favorably than the system in question. The second type of risk associated with credit scoring systems is when individual subjective judgment occurs, as is in the case of system overrides. As long as human judgment is a factor, the possibility for discrimination against a protected class of applicants exists. Hence, the focus of fair lending compliance testing is on the scoring system override process.

As is the case for overage/underage analysis for mortgage loans, rigorous monitoring requires the ability to perform statistical tests to determine if the incidence of overrides differs significantly for various protected classes of borrowers when compared with the control group. Consider the following home improvement loan underwriting, where the treatment group is comprised of African-American applicants and White Non-Hispanic Applicants make up the control group. Suppose that the lender's credit policy requires that low-side overrides be held to 5 percent or less, while high-side overrides must be maintained below a ten percent threshold. As an example, FIG. 19 depicts at 1800 a home improvement scorecard override monitoring summary. The example appears to be within compliance guidelines for the home improvement scorecard when reviewed by credit policy risk management. However, from a fair lending compliance view, the situation is clearly in need of further analysis.

In this example, the mix of high and low-side overrides is skewed in both instances in favor of the control group. These data are sufficient to assert that the override process has a disparate impact on African-American applicants for home improvement loans, for the period in question. In order to further assert that the override process had a disparate treatment effect, one needs to show that the credit applicants in the control and treatment groups possessed similar qualifications relative to the lender's prevailing underwriting standards. Certainly, the fact that both groups have been credit scored means that the applicants in question in each group have been put in the same bucket relative to the score cut-off, but we do not know how they may differ relative to policy override factors.

In the case where a hybrid model is constructed, overrides fall into handle cells and they can be analyzed in relation to their segment counterparts. Within that context, one can compare the distribution differences between protected classes and control group using the likelihood ratio statistic ($G^2$). For groups having a significant difference, the individual handle cells can be examined to determine why protected and non-protected class credit applicants would have different override rates. In the case where a hybrid model does not exist, traditional predictive modeling is used to identify possible contributing factors.

Figure 20:
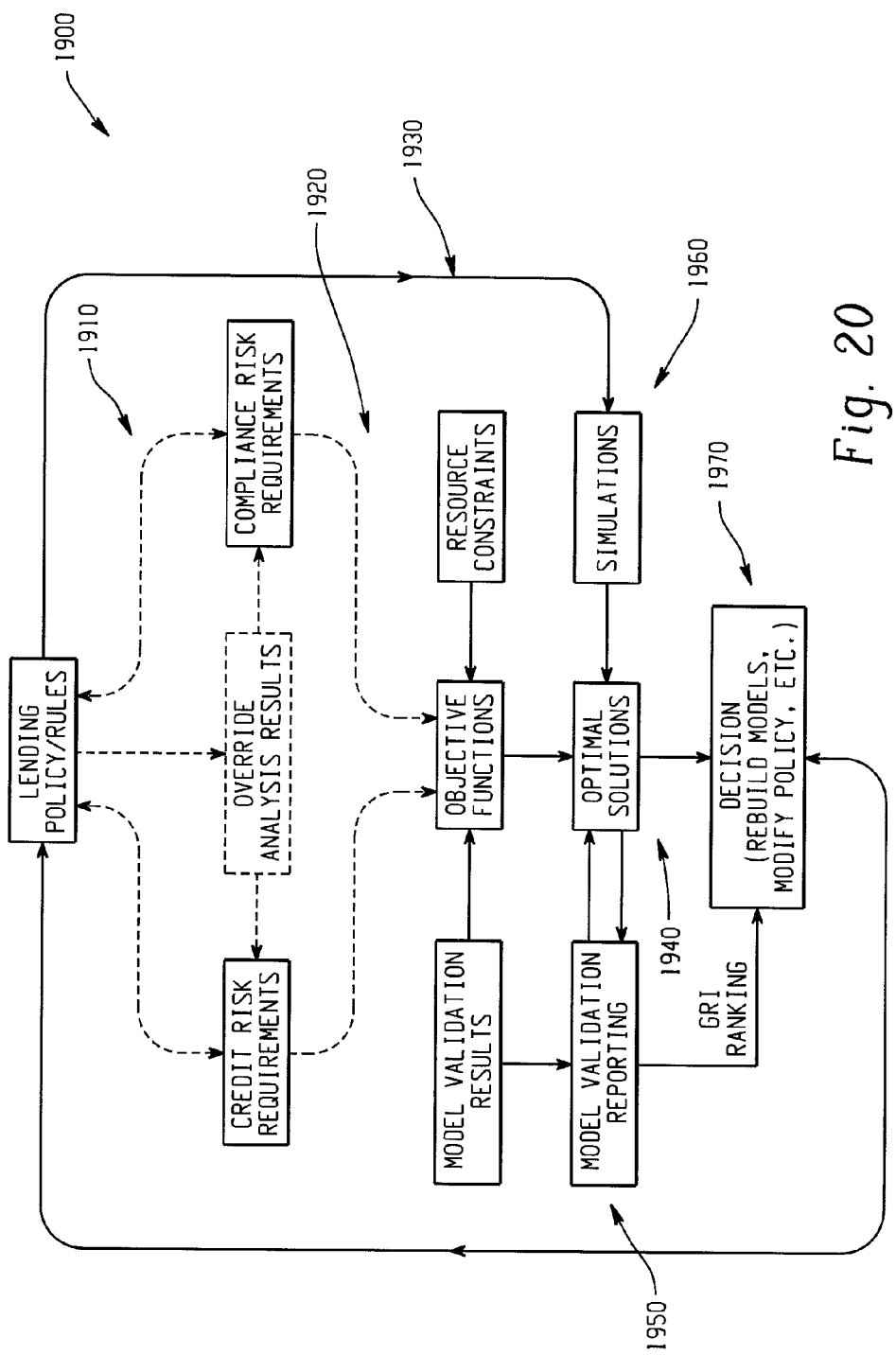
FIG. 20 is a block diagram depicting an optimization process.

As discussed above (e.g., with respect to process 730 in FIG. 8), a model validation system can include an optimization process which can be integrated into a validation process to balance credit and compliance risk objectives. An example of an optimization process is shown at 1900 in FIG. 20. The formulation of the mathematical programming problem is important, and care must be taken to specify the objective(s) and all applicable constraints, such as by considering the rules and requirements shown at 1910. In general, we can start with a simple linear programming formulation that can yield acceptable results. Using a champion/challenger approach, different problem formulations and solution algorithms are tested and the one with the most useful solutions is adopted as a champion that is later subjected to challenges from an evolution of competing methods and more sophisticated problem formulations. The standard form of a linear programming (LP) problem is:

Maximize $d + c^T x$

Such That $Ax \leq b, x \geq 0$, where d is a constant term, x is a n-column vector corresponding to n decision variables, c is an n-row vector of objective function coefficients corresponding to the decision variables, A is an m by n matrix whose rows correspond to problem constraints and that specifies coefficients for every decision variable within every constraint row, b is an m-column vector corresponding to bounds associated with the individual row constraints.

We proceed to describe some problem formulation aspects for the optimization of credit risk and fair lending compliance. A theme is the connection between risk management and compliance, and leveraging on the field of operations research for help in integrating and optimizing their respective models is a natural path to take. The dual objective is to maximize model predictability for "good versus bad" performance and to minimize disparate impact on all protected classes, subject to a set of constraints that encompass line of business, regulatory, credit risk, portfolio and resource limitations. The outputs from this optimization process can be used to balance the trade-offs between compliance risk and credit risk and make decision on model rebuilding according to available resources. In practice, a single objective function may be adopted, with the second objective expressed as a series of constraints. An example of a specific instance of validation optimization for loan approval would be to maximize separation of good and bad default risk distributions subject to restricting the difference between protected class i, and the corresponding non-protected class, denial rates, for similarly situated credit applicants in handle cell j, to be less than $\epsilon_{ij}$ percent and constraints that encompass line of business, regulatory, and portfolio limitations. (e.g., not exceed certain thresholds).

The first step is to define the set of decision variables, denoted as "x." Their interpretation is based on the values of subscript patterns, where the subscripts are defined to denote key business parameters for the optimization problem, for example:

i: Protected class membership indicator: separate range of numbers for treatment groups and control groups
j: Handle cell number (identifies the segment)
k: Portfolio Strategy/Action table number
l: Variable type, where 1=acceptance rate, 2=default rate, 3=acceptee population mix, 4=total population frequency, 5=expected total population frequency, 6=observed counts, 7=expected counts, 8=market penetration, . . .
m: Market identifier (e.g., MSA, state, etc.)
n: Channel Identifier
o: Legal Entity/Line of Business
p: Loan Purpose/Product/Program identifier
q: Scenario identifier—where scenarios may be probability weighted
r: Time (e.g., quarter/year identification, etc.)

This example is an illustration of more of a "general case" along with the types of decision variable dimensions that may be desired or required. How many subscripts are needed, and which among them, or possibly others, should be used, depends upon the problem definition. This will vary by lending institution.

It is suggested that before embarking on the development of a comprehensive model, an initial simplified model be developed that can be incrementally enhanced in an orderly and systematic fashion. As subscripts are added to the decision variables, the values they are allowed to take on should be restricted to just two or three for initial experimentation. A consideration is when to add a subscript, versus segmenting the data and building separate models for each segment. There is no general rule that applies, and this is where controlled experimentation can be used to determine the most advantageous approach.

To help establish objective functions at 1920, we compute optimal thresholds for each individual candidate model, which, in turn, determine the total number of conditional or interaction variables as covariate patterns that minimize $X^2$, the Pearson chi-square statistic. The objective function is to identify the optimal policy thresholds that maximize credit access, subject to credit default, and other constraints. A formulation of the problem may express the objective function as minimizing deviance of strategy from expected outcome, relative to all parameters described above. Here we may use the chi-square form to minimize the deviance between the observed and expected handle cell frequencies:

$$\text{Minimize}(X^2 = \Sigma\{(X_{ijk4mnopqr} - X_{ijk5mnopqr})^2 / (X_{ijk5mnopqr})\}),$$

where the subscripts ijklmnopqr are defined as previously indicated. This formulation can be modified to allow for an LP approach. One option would be to use an alternative risk measure as an objective function, or to reformulate the problem with appropriate risk constraints, where $X^2$ is replaced with an alternative measure, such as mean absolute deviation (MAD). MAD is defined as the sum of the absolute deviations of the observed and fitted values over all handle cells. This translates to the following general form of the objective function:

$$\text{Minimize MAD}(x_{ijklmnopqr}) = \Sigma_i \ldots \Sigma_r |x_{ijklmnopqr} - x_{ijklmnopqr}|$$

The objective function can be expanded to consider additional model performance factors. For example, you could maximize the predictive ability as measured by the development sample results, plus the ability to satisfactorily replicate as measured by the validation sample, plus the stability of the models as measured by the variation of policy thresholds and other model givens. As was the case with the dual objective associated with compliance (credit access) these additional objectives can be addressed as model constraints or as post-optimality exercises to check the sensitivity of an optimal solution to these additional considerations. Another alternative would be to address these aspects as part of the model reporting and ranging process using UPI that is described below.

For identifying constraints at 1930, There are various constraints that need to be considered when maximizing model performance (or, equivalently, minimize error rate), and some examples are:

Compliance Constraints. There is a range of possible action tables associated with a hybrid model. In this example, there is a separate overall acceptance rate, and an associated set of acceptance rates for subgroups of credit applicants, for each choice of a risk index cut-off point. In evaluating a particular model validation, a range of "c" alternative hybrid model action tables is included, with associated values, as input to the optimization model. A primary focus of the optimization model relates to matched-pair logic, since the constraints on similarly situated applicants are directly impacted. For example, there is some guidance on a maximum absolute difference in incomes or loan amounts to be eight percent, in addition to other matching criteria such as similar product, same market, similar time of application, and so on. The mathematical representation of these constraints would resemble the following set of inequalities:

$x_{Tjk1} - x_{Cjk1} \leq \epsilon_{ijk1}$, where $i=_T$ denotes treatment group and $i=_C$ denotes control group and i ranges over the number of treatment groups, say 1 to $n_T$ and control groups, say 1 to $n_C$;

j=1, . . . m ; k=1, . . . ,c; l=1 signifies variable type is acceptance rate where $n = n_T + n_C$ is the number of identifiable protected classes and control groups (relative to race, ethnicity, gender for HMDA data), m is the number of distinct handle cells in the hybrid model, c is the number of alternative risk index cut-off strategies, $X_{ijk1}$ and $x_{ijk1}$ represent the $i^{th}$ protected class, and non-protected class, acceptance rates for the $j^{th}$ handle cell in the $k^{th}$ action table associated with the hybrid model, and $\epsilon_{ijk}$ represents the upper bound on the difference between acceptance rates for protected class i falling within the handle cell j, associated with action table k. In the event more granularity is desired for the definition of similarly situated borrowers than is afforded by the handle, then the subscript "j" can be defined to denote the "similarly situated group j".

Credit Risk Constraints. Consider a range of possible action tables associated with a hybrid model. There is a separate overall default rate, and an associated set of default rates for subgroups of credit applicants, independent of the choice of a risk index cut-off point. In evaluating a particular model validation, a range of "c" alternative hybrid model action tables is included, with associated values, as input to the optimization model. A primary focus of the optimization model relates to achieving a desired overall risk/return target, which translates to selection of handle cells having default rates in an acceptable range. Furthermore, in this case we want to ignore protected class status as we compare default rates for alternative action table-based strategies. The mathematical representation of these constraints would resemble the following set of inequalities:

$x_{+jk2} \leq \delta_{jk2}$, j=1, ... m, k=1, ... ,c;
l=2 signifies variable type is default rate
where m is the number of distinct handle cells in the hybrid model, c is the number of alternative risk index cut-off strategies, $x_{+jk2}$ represents the default rate for the $j^{th}$ handle cell in the $k^{th}$ action table associated with the hybrid model, and $\delta_{jk}$ represents the upper bound on the default rate for handle cell j associated with action table k. There may be other credit constraints that relate to the dimensions making up the handle cell index (e.g., LTV). In that case, the number of high LTV loans could be constrained by number, or frequency, by collapsing the handle on all but the LTV dimension (i.e., by summing the $x_{ijklmnopqr}$'s over the appropriate values of the handle cell subscript "j" and specifying the bound for the right-hand side of the constraint inequality).

Business Constraints. Different lines of business have different loan policies and restrictions. Successive optimizations may be run on alternative models that can be created by varying the pre-determined policy thresholds for each of the credit model predictors. Results can be examined to gauge the sensitivity of validation optimization to how the credit risk model variables are categorized or the sensitivity to policy thresholds for various loan products and programs. In the event models are evaluated for deployment across lines of businesses, then there may be an additional set of conditions, and an additional line of business subscript, to allow for any restrictions that may apply.

Portfolio Constraints. The most common example of a portfolio constraint would relate to concentrations. For example, if there was a geographic concentration restriction on particular market areas and one or more of the validation models was superior because of higher potential acceptance rates that included those areas, then higher achievable acceptance rates for a protected class relative to similarly situated borrowers may not be possible because it would trigger a portfolio concentration exception to policy. Constraints could be added to avoid selecting models that will exceed concentration limits for the portfolio. The same example would hold for small business lending, where we might be considering industry concentrations. Most lenders restrict the dollar ratio of loans in a particular industry that are outstanding to Tier 1 capital (plus allowance for loan and lease losses). For example, a bank may not want more than a fifteen percent ratio for convenience store loans, church loans, start-up companies (independent of sector) etc. In small business lending the modeler could substitute low/moderate income borrowers or business locations for protected class designations, and the corresponding middle/high income bracket for non-protected class designations.

With respect to producing optimal solutions at 1940, a linear programming (or other mathematical programming) formulation of this dual objective problem may not yield an optimal solution that sufficiently addresses all of the various aspects relative to credit and compliance concerns. This case may prove to be the rule, rather than the exception. In these circumstances, an improved solution may be developed using alternative approaches. One such example might be scenario simulations that are created based on business objectives and constraints, as described above, where certain problem parameters are allowed to vary within proscribed ranges. In any event, compliance regulations, examination guidance, corporate credit and compliance policies, and sound business judgment should be used to select the best models that balance the trade-offs between compliance risk and credit risk.

With respect to model validation reporting at 1950, model management is an extension of model validation process. It provides an environment to effectively validate and update models. As the number of models increase, model management plays significant role in monitoring, interpreting, maintaining, and reporting model validation results.

Figure 21:
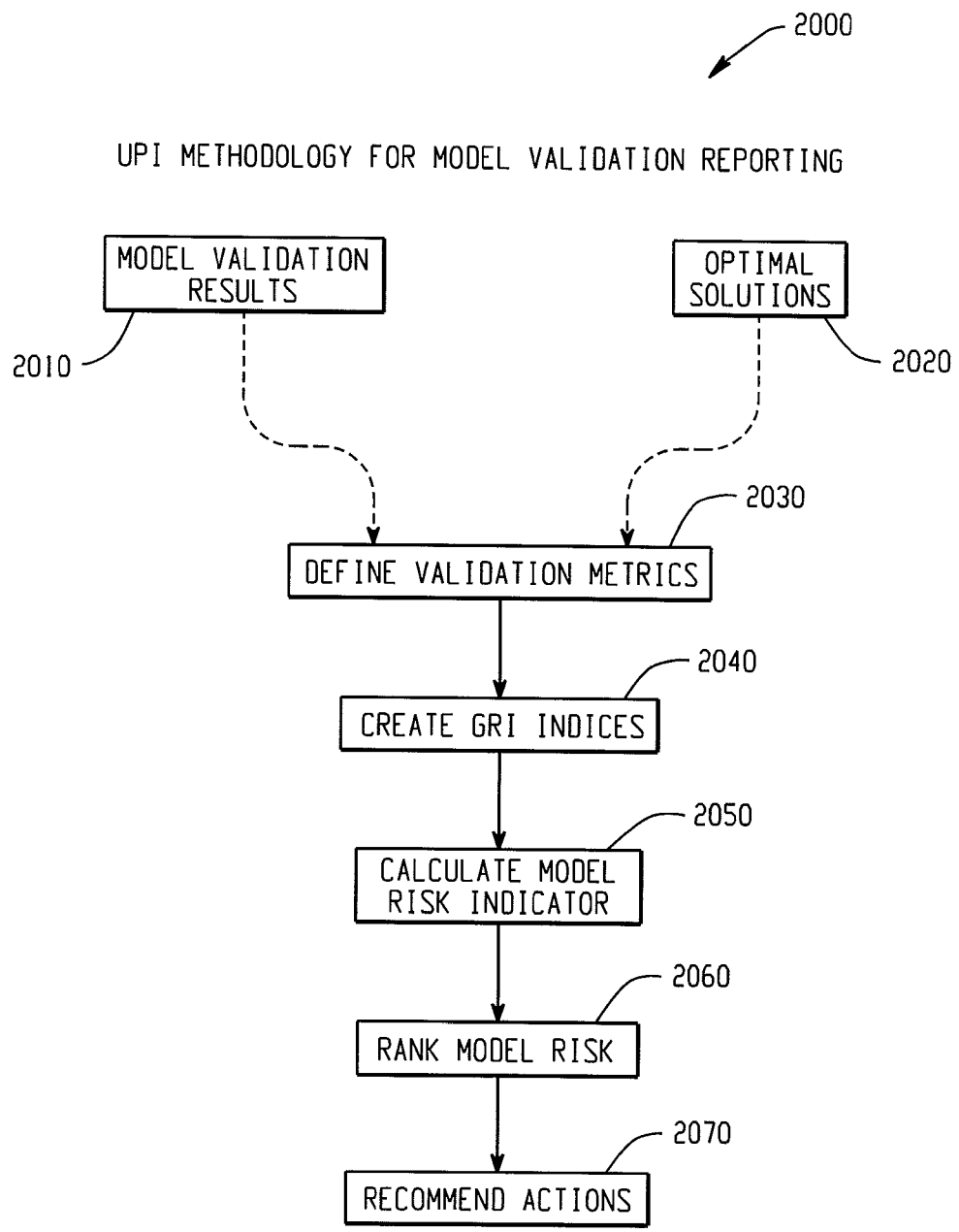
FIG. 21 is a block diagram depicting model validation reporting.

When validating a model, it is to be determined what the model is validated against. Many different metrics can be used for this purpose. The main idea here is to show how model performance is measured against expectations and benchmarks, which can be defined with a set of disparity indices. An example of the process is depicted in FIG. 21. With reference to FIG. 21, the first step is to create at 2030 based upon model validation results 2010 and optimal solutions 2020 performance indices that involve defining disparity indices. A disparity index is defined as the actual performance measure relative to its expected performance measure. The actual model performance measure will appear in either the numerator, or denominator, of the index depending upon the nature of the index. Indices that measure positive aspects of model performance, such as stability, have the actual model performance measure positioned in the numerator. Indices that measure negative aspects of model performance, such as model lift decay, have the actual model performance measure positioned in the denominator. Examples of those indices include:

Model performance residual index (MRI) is the difference between the actual risk profile and predicted risk distribution of the champion, or benchmark, model relative to the difference between the actual risk profile and predicted risk distribution for the challenger model. Values in excess of one indicate the challenger model is a closer fit to the actual data.

$$MRI = \chi^2_{champion} / \chi^2_{challenger}$$

Model lift decay index (MLI) measures the change in model lift for the champion model relative to the champion model. Values in excess of one indicate the challenger model possesses superior predictive strength.

$$MLI = G_{challenger}/G_{champion},$$

where G denotes the Gini coefficient

Model stability index (MSI) measures the ability of the challenger model to rank order segments over time relative to that for the champion, or benchmark, model. Instability in ordering would suggest that the model is not capturing the underlying and relatively constant information about the risk of different credits. Values in excess of one indicate the challenger model possesses superior stability.

$$MSI = T_{champion}/T_{challenger},$$

where T denotes the Wilcoxon signed rank test statistic calculated for every handle cell based on the corresponding risk index value that is measured at the same two points in time for both challenger and champion models. In the case where multiple points in time are to be considered, the Friedman rank test can be substituted for the Wilcoxon signed rank test.

Model usage index (MUI) is the ratio of the utilization rates for the challenger and champion models, respectively. Values in excess of one indicate the challenger model is more highly utilized than the benchmark champion model.

Usage Rate$_{Challenger}$=number of usage instances for challenger model/number of usage instances for all models Usage Rate$_{Champion}$=number of usage instances for champion model/number of usage instances for all models $$MUI = \text{Usage Rate}_{Challenger}/\text{Usage Rate}_{Champion}$$

Model aging index (MAI) is the ratio of the utilization rates for the champion and challenger models, respectively. Values in excess of one indicate the challenger model is newer than the benchmark champion model.

Aging Rate$_{Challenger}$=time since last re-build for challenger model/average time since last re-build for all models Aging Rate$_{Champion}$=time since last re-build for champion model/average time since last re-build for all models $$MAI = \text{Aging Rate}_{Champion}/\text{Aging Rate}_{Challenger}$$

Model profitability index (MPRI) is the ratio of the difference in expected profit and actual profit over all segments in the hybrid model for the champion and challenger models, respectively. Values in excess of one indicate the challenger model is tracking closer to profitability targets than the benchmark champion model. The chi-square statistic is computed on the actual versus expected profit in each handle cell. This measure should not be confused with assessing which model is more profitable. Positive and negative variations have the same weight in the calculation.

$$MPRI = \chi^2_{champion}/\chi^2_{challenger}$$

Figure 22:
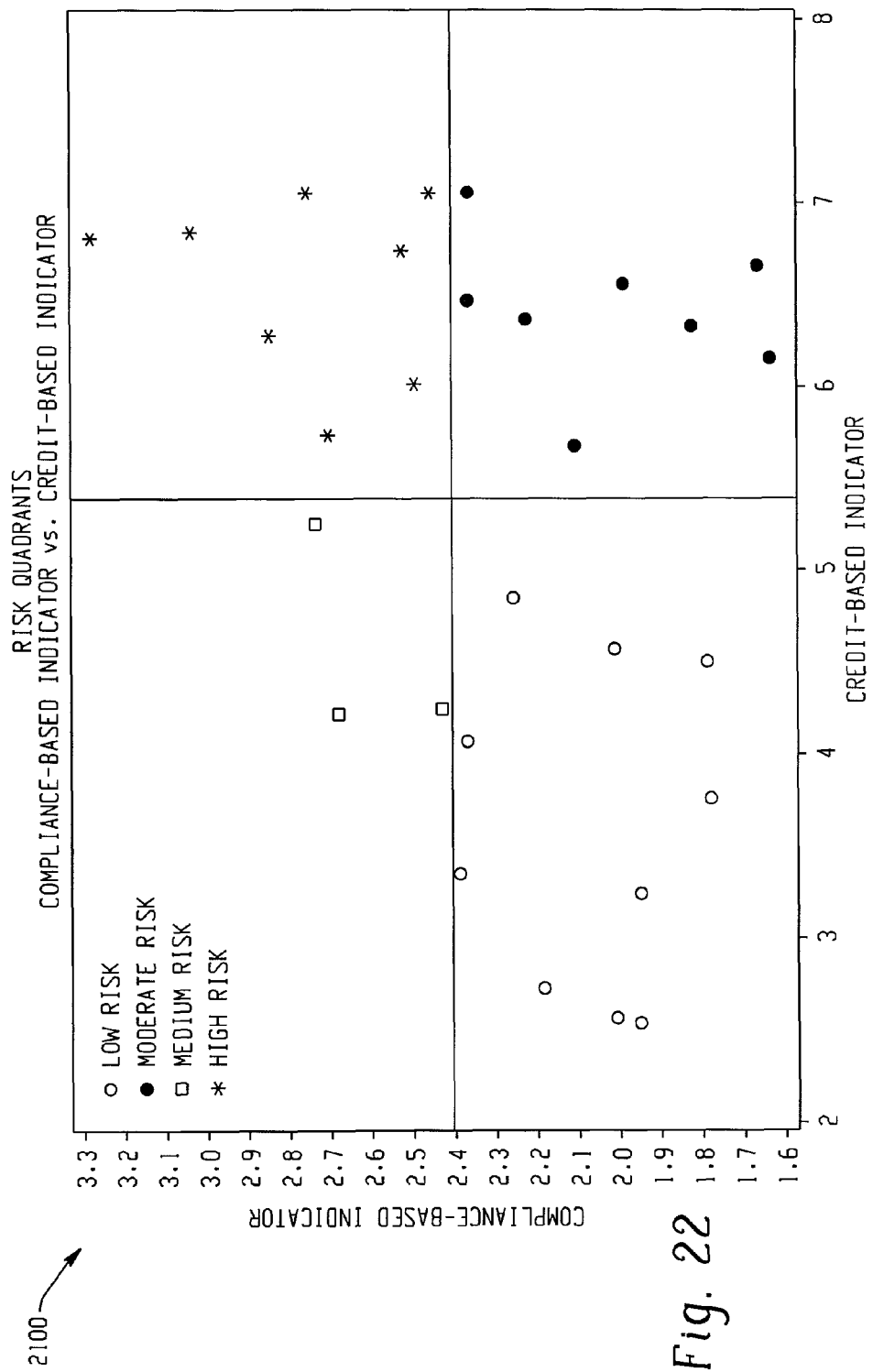
FIG. 22 is a graph depicting model risk indicator values being placed into quadrants.

The next step is to calculate at 2040 risk indicator values for each individual model. Each model has values for both credit risk and compliance risk. We can further categorize these model risk indicator values into quadrants, using the reference lines based on predefined index values as shown in FIG. 22. The four quadrants as shown at 2100 in FIG. 22 are:

1. High Risk Quadrant. High credit disparity and high compliance disparity. Models in this quadrant are underperformers compared with the norm in sustainable credit risk predictive power and also exhibit relatively high disparate impact for similarly situated credit applicants (i.e., applicants in the same handle in a hybrid model).
2. Medium Risk Quadrant. High credit disparity and low compliance disparity: Models in this quadrant are underperformers compared with the norm in sustainable credit risk predictive power, but are average or have relatively low disparate impact for similarly situated credit applicants.
3. Moderate or Low Risk Quadrant. Low credit disparity and high compliance disparity Models in this quadrant are average or better compared with the norm in sustainable credit risk predictive power and also exhibit relatively high disparate impact for similarly situated credit applicants (i.e., applicants in the same handle in a hybrid model).
4. Low or No Risk Quadrant. Low credit disparity and low compliance disparity. Models in this quadrant are average or better compared with the norm in sustainable credit risk predictive power and are average, or have relatively low, disparate impact for similarly situated credit applicants.

Step 2050 calculates the total model risk indicators. The total risk indicator is used to measure and rank order model total risk at 2060. FIG. 23 depicts at 2200 an example of using several typical indices to create model risk indicator across different models. Based upon the results, step 2070 recommends actions for models.

With reference back to FIG. 20, process 1970 provides for interpreting validation results and involves the model update/rebuild decision. A proper interpretation of model validation results considers sample size and sample selection method. Certainly, the output of model validation includes the final recommendation to do nothing, or adjust the model (if possible), rebuild the existing models, or implement an alternative model. This will depend on not only objective statistical criteria but also business needs, constraints and regulatory requirements. This is due to the fact that a model's performance depends on multiple factors. For example, a model's performance is likely to be better in a stable economic environment than one that is more volatile or, worst case, chaotic. Therefore, evidence should be balanced from a variety of metrics when building and evaluating models. A model re-build decision should be based on an observation window of sufficient duration. In other words, a three-month window for assessing performance, rather than a one month window, may prove to be desirable.

One of the issues facing a lending institution is to focus attention and allocate adequate resources to validation activities in order to achieve maximum return on investment. The model optimization process can be used to achieve this objective and help make decisions around the necessity and timing of model retirement and redevelopment. The model optimization process described above can be used to minimize model-related risk. There are many changes that occur over time that can impact model performance. Some of those changes occur due to the macro-economic cycle. As interest rates have risen, option priced and adjustable rate mortgage defaults have been repricing. This will cause the related application-time risk profiles of defaulted borrowers who may have acceptable risk profiles at the time of the mortgage application, to be associated with bad performance the next time a model is developed. At the same time, a new marketing push to penetrate into new markets, coupled with heightened competitive pressures, could cause a lender to penetrate deeper into the risk pool of applicants. As a result, the risk distribution of credit applicants coming through the door will experience significant shifts. The optimization process described responds to these circumstances by identifying when a model needs to be rebuilt, deciding the optimal time to rebuild the model, and determining the optimal number of models to rebuild.

New generations of consumer credit models should incorporate alternative data and a practical consideration is managing a persistent and increasing operational burden of model development, verification, testing, performance benchmarking, deployment, and retirement of traditional and alternative models. Model life-cycle management will become even more of a focal point, with the imperative to ensure that models are constantly re-evaluated and either updated, if possible, or replaced as soon as performance drops below a pre-determined threshold.

While examples have been used to disclose the invention, including the best mode, and also to enable any person skilled in the art to make and use the invention, the patentable scope of the invention is defined by claims, and may include other examples that occur to those skilled in the art. For example, the validation systems and methods disclosed herein can be configured to integrate compliance validation components into the credit risk validation process to ensure that credit models appropriately balance risk and return while meeting compliance requirements. This balancing process can be formulized using the credit and compliance optimization process (CCOP). Model performance metrics can be defined that capture various aspects of model validation and dual objectives of credit and compliance risk management. Risk quadrants can be used to examine the relation between credit risk and compliance risk to achieve the optimal balance relative to benchmark, or other, reference points. This framework also can connect different model validation areas with a unified metric handle to simplify validation processing and enhance efficiency and interpretability. Such an approach supports Basel II model validation principles through effective integration of both quantitative and judgmental components, and by providing results that are highly actionable across different model areas and components. While the framework and examples used for illustration have been mainly for consumer lending default risk models, the methodology can be applied in many other situations, such as creating risk tiers for loss forecasting and estimating default probabilities for risk ratings used in commercial credit. The following table illustrates this:

| Credit Integrated With Compliance Hybrid Credit Models | Compliance Assessment Fair Lending Testing | Credit Risk Management Credit Scoring |
| --- | --- | --- |
| Generic loan product model | Id largest exposures with the universal performance indicator (UPI) | Generic or industry-option bureau score |
| Institution-specific, loan product-specific, channel-specific hybrid model. | Refine description of exposure and identify the population of interest. | Institution-specific, loan product-specific, channel-specific credit score. |
| Define multi-stage process (including MLS/handles) | Sampling & significance testing | Scorecard adaptability test |
| RE&PF system: construct strategy-specific action tables | Control for policy and known causes and re-test using DCP | Scorecard development |
| Overall, and handle cell, model validation | Model validation & assessment | Model validation |
| Multi-dimensional segment analysis including disparate impact analysis via UPI | Matched-pair comparisons (optimization) | Override business rules updating |
| Applicant profile analysis | Identify members of injured class | Population stability analysis |
| Handle cell risk index updating and DCP-based disparate treatment testing | Quantify financial injury | Validation: G/B separation & rank ordering |
| Quantify overall lift from RE&PF update | Quantify the magnitude of expected loss | Decision to keep, or retire, scorecard |
| Impact of a change in policy, including thresholds, and CCOP-based sensitivity analysis | Risk mitigation strategy | Impact of a change in cut-off score |

In general, hybrid models (leftmost column) provide an additional layer of transparency and connectedness between credit risk management (rightmost column) and compliance risk management (middle column).

As another illustration, a system and method can be configured with the approaches (e.g., the handle-based method for model validation) as disclosed herein in order to achieve:
- More realistic and flexibility: each data segment is created based on the handle and is assigned a different weight based on business requirements, instead of being controlled by purely statistical testing methods
- Interpretability: this is due to the fact that business scenarios are integrated to create the handle and statistical test grouping
- Balance compliance risk and credit risk: the trade-off between compliance risk and credit access risk can be easily simulated and optimized
- More actionable: business decision can be made based on a unified metric instead of multiple results from different validation areas
- Applicability: While these methods are illustrated mainly with examples of consumer lending default risk models, they also can be applied in many other situations, such as creating risk tiers for loss forecasting and estimating default probabilities for risk ratings used in commercial credit.

Figure 24:
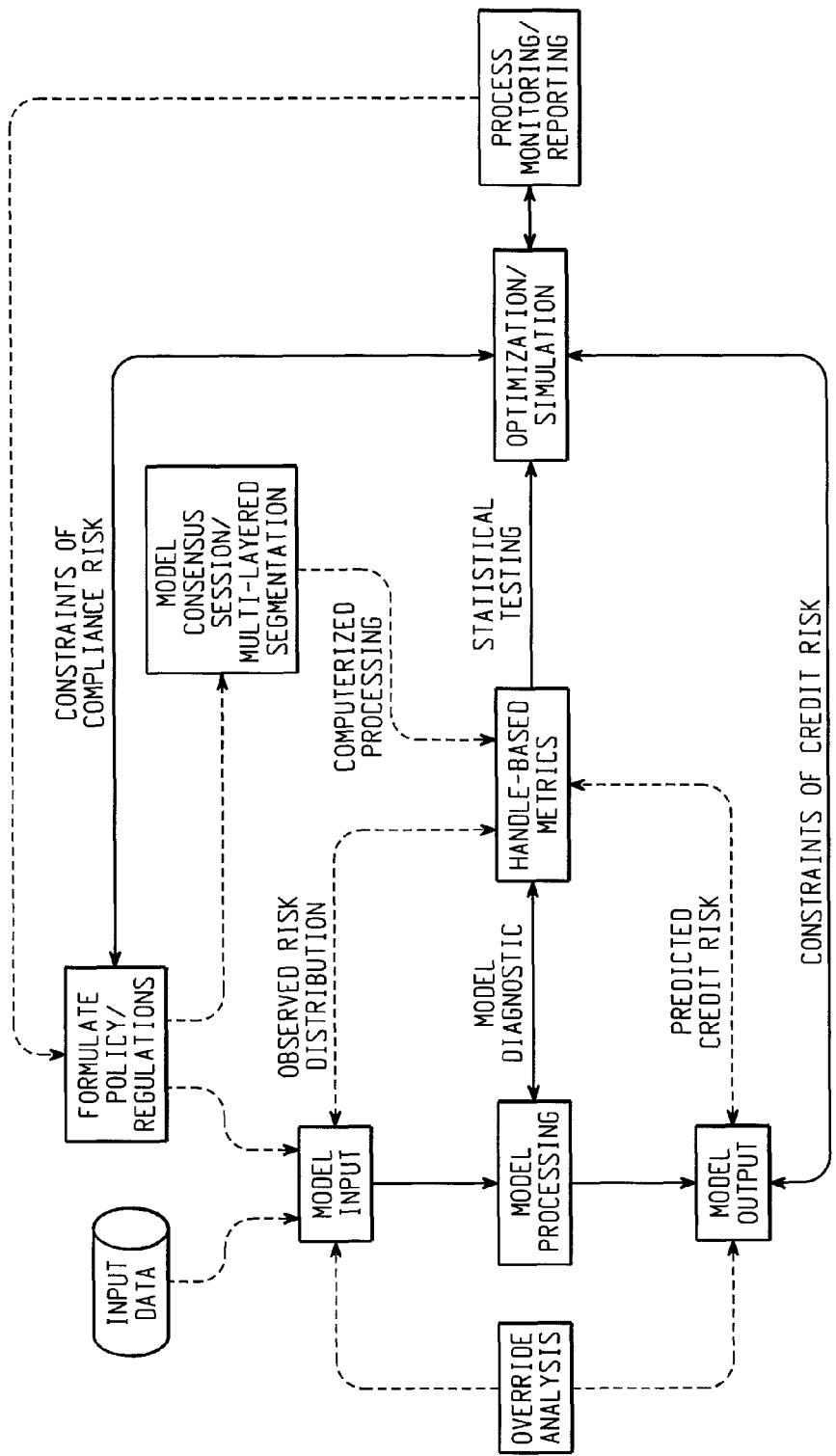
FIG. 24 is a block diagram depicting another model validation system.

As yet another example of the wide scope of the systems and methods disclosed herein, the systems and methods disclosed herein can be used with the systems and methods disclosed in U.S. Application Ser. No. 61/130,319, (entitled "Computer-Implemented Risk Evaluation And Model Validation Systems And Methods" and filed on May 29, 2008); and U.S. patent application Ser. No. 12/325,468 filed Dec. 1, 2008 entitled "Computer-Implemented Risk Evaluation Systems And Methods" which claims priority to U.S. Patent Application Ser. No. 60/991,050 filed Nov. 29, 2007 entitled "Computer-Implemented Risk Evaluation Systems And Methods." The entire disclosures (including any and all figures) of all of these applications are incorporated herein by reference. For example, the systems and methods which include action tables disclosed in these applications may be used with the systems and methods disclosed herein for loan application evaluation. Still further, a model validation system and method can be configured with the processing disclosed on pages B-64 to B-77 of U.S. Application Ser. No. 61/130,319, (entitled "Computer-Implemented Risk Evaluation And Model Validation Systems And Methods" and filed on May 29, 2008). As an example, the process flow of FIG. 2 as may be modified to include the processing depicted in FIG. 24 (which is on page B-64 of the aforementioned provisional application). Still further, a model validation system and method can be configured with the multi-layered segmentation processing disclosed on pages B-78 to B-121 of U.S. Application Ser. No. 61/130,319, (entitled "Computer-Implemented Risk Evaluation And Model Validation Systems And Methods" and filed on May 29, 2008).

It is noted that the systems and methods may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for validating a credit risk model, comprising:

accessing, using one or more data processors, historical loan performance data including a plurality of records, wherein a record includes a plurality of borrower attributes and a default attribute associated with a loan, wherein the default attribute identifies whether a borrower defaulted on making payments associated with the loan, and wherein the plurality of borrower attributes includes both quantitative and qualitative components;

dividing, using the one or more data processors, each of the borrower attributes into a plurality of borrower attribute levels, wherein dividing the qualitative components includes quantizing the qualitative components into a discrete number of levels;

combining two or more borrower attribute levels;

generating, using the one or more data processors, a handle data structure including one record for each combination of borrower attribute levels, wherein the handle data structure represents a set of unified metrics including all possible combinations of covariate patterns, wherein the handle data structure is associated with a joint distribution of risk characteristics, and wherein a default probability is assigned to each record using default attributes from the historical loan performance data;

generating, using the one or more data processors, a credit risk model, wherein the credit risk model associates a risk level measurement with each record in the handle data structure; and performing one or more validation operations on the credit risk model to determine whether the credit risk model is acceptable for use in a production environment.

2. The method of claim 1, wherein the one or more validation operations include a model performance validation operation or a model compliance validation operation.

3. The method of claim 1, wherein performing a validation operation further comprises:

determining a distribution of risk level measurements for two different groups of borrowers using the credit risk model, wherein the two different groups are mutually exclusive;

determining whether there is a statistically significant difference between the two distributions, wherein disparate treatment corresponding to one of the groups is identified when a statistically significant difference is determined; and adjusting one or more of the risk level measurements of the credit risk model when disparate treatment corresponding to one of the groups is identified.

4. The method of claim 3, further comprising:
determining whether each distribution corresponding to each group's handle data structure is ranked logically when adjusted by the corresponding risk level measurement.

5. The method of claim 4, further comprising:
logically ranking the distributions by sorting the distributions according to the corresponding risk level measurement.

6. The method of claim 3, further comprising:
determining whether one or more of the distributions corresponding to the handle data structure is internally inconsistent based on a logical criteria.

7. The method of claim 3, further comprising:
determining whether the distributions corresponding to each group's handle data structure are ranked identically.

8. The method of claim 1, wherein the borrower attribute levels are subjective levels.

9. The method of claim 1, wherein a record in the handle data structure represents a covariate pattern that is predictive of the default probability.

10. The method of claim 1, wherein a record in the handle data structure represents a homogeneous segment in terms of risk, performance, and choice behavior.

11. The method of claim 1, further comprising:
segmenting borrowers based upon primary underwriting factors.

12. The method of claim 11, wherein the handle data structure allows for treatment of specific segments by embedding class priors with different thresholds and business policies.

13. The method of claim 1, wherein the risk level measurements predict the default probability.

14. The method of claim 13, wherein a risk level measurement is associated with a record in the handle data structure by a handle number.

15. The method of claim 14, wherein the association of the handle number provides a direct comparison between observed risk in the historical loan performance data and predicted risk in output data of the credit risk model.

16. The method of claim 1, wherein performance of the credit risk model is measured through credit risk and compliance risk perspectives.

17. The method of claim 1, wherein the performance of the credit risk model is measured through an optimization process.

18. The method of claim 17, wherein a risk quadrants plot is used to balance trade-offs between compliance risk and credit risk in adjusting the risk level measurements.

19. The method of claim 17, wherein outputs from the optimization process facilitate model rebuilding according to available resources.

20. The method of claim 1, wherein the handle data structure integrates the quantitative and qualitative components.

21. The method of claim 1, wherein the credit risk model is developed through a model consensus session to provide model evaluation, specifications, and selection.

22. The method of claim 1, further comprising:
performing override analysis by matching override incidence to the records in the handle data structure, wherein results from the override analysis are used as feedback and in creation of records in the handle data structure and model performance evaluation.

23. The method of claim 1, wherein the qualitative components are based on subjective judgment assessments of conditions.

24. A system for validating a credit risk model, comprising:
one or more processors;
one or more computer-readable storage mediums containing instructions configured to cause the one or more processors to perform operations including:
accessing historical loan performance data including a plurality of records, wherein a record includes a plurality of borrower attributes and a default attribute associated with a loan, wherein the default attribute identifies whether a borrower defaulted on making payments associated with the loan, and wherein the plurality of borrower attributes includes both quantitative and qualitative components;
dividing each of the borrower attributes into a plurality of borrower attribute levels, wherein dividing the qualitative components includes quantizing the qualitative components into a discrete number of levels;
combining two or more borrower attribute levels;
generating, using the one or more data processors, a handle data structure including one record for each combination of borrower attribute levels, wherein the handle data structure represents a set of unified metrics including all possible combinations of covariate patterns, wherein the handle data structure is associated with a joint distribution of risk characteristics, and wherein a default probability is assigned to each record using default attributes from the historical loan performance data;
generating, using the one or more data processors, a credit risk model, wherein the credit risk model associates a risk level measurement with each record in the handle data structure; and
performing one or more validation operations on the credit risk model to determine whether the credit risk model is acceptable for use in a production environment.

25. The system of claim 24, wherein the one or more validation operations include a model performance validation operation or a model compliance validation operation.

26. The system of claim 24, wherein performing a validation operation further comprises:
determining a distribution of risk level measurements for two different groups of borrowers using the credit risk model, wherein the two different groups are mutually exclusive;
determining whether there is a statistically significant difference between the two distributions, wherein disparate treatment corresponding to one of the groups is identified when a statistically significant difference is determined; and adjusting one or more of the risk level measurements of the credit risk model when disparate treatment corresponding to one of the groups is identified.

27. The system of claim 26, wherein the operations further include:
determining whether each distribution corresponding to each group's handle data structure is ranked logically when adjusted by the corresponding risk level measurement.

28. The system of claim 27, wherein the operations further include:
   logically ranking the distributions by sorting the distributions according to the corresponding risk level measurement.

29. The system of claim 26, wherein the operations further include:
   determining whether one or more of the distributions corresponding to of handle data structure is internally inconsistent based on a logical criteria.

30. The system of claim 26, wherein the operations further include:
   determining whether the distributions corresponding to each group's handle data structure are ranked identically.

31. The system of claim 24, wherein the borrower attribute levels are subjective levels.

32. The system of claim 24, wherein a record in the handle data structure represents a covariate pattern that is predictive of the default probability.

33. The system of claim 24, wherein a record in the handle data structure represents a homogeneous segment in terms of risk, performance, and choice behavior.

34. The system of claim 24, wherein the operations further include: segmenting borrowers based upon primary underwriting factors.

35. The system of claim 34, wherein the handle data structure allows for treatment of specific segments by embedding class priors with different thresholds and business policies.

36. The system of claim 24, wherein the risk level measurements predict the default probability.

37. The system of claim 36, wherein a risk level measurement is associated with a record in the handle data structure by a handle number.

38. The system of claim 37, wherein the association of the handle number provides a direct comparison between observed risk in the historical loan performance data and predicted risk in output data of the credit risk model.

39. The system of claim 24, wherein performance of the credit risk model is measured through credit risk and compliance risk perspectives.

40. The system of claim 24, wherein the performance of the credit risk model is measured through an optimization process.

41. The system of claim 40, wherein a risk quadrants plot is used to balance trade-offs between compliance risk and credit risk in adjusting the risk level measurements.

42. The system of claim 40, wherein outputs from the optimization process facilitate model rebuilding according to available resources.

43. The system of claim 34, wherein the handle data structure integrates the quantitative and qualitative components.

44. The system of claim 24, wherein the credit risk model is developed through a model consensus session to provide model evaluation, specifications, and selection.

45. The system of claim 24, wherein the operations further include: performing override analysis by matching override incidence to the records in the handle data structure, wherein results from the override analysis are used as feedback and in creation of records in the handle data structure and model performance evaluation.

46. The system of claim 24, wherein the qualitative components are based on subjective judgment assessments of conditions.

47. A computer-program product for validating a credit risk model, tangibly embodied in a non-transitory machine-readable storage medium, including instructions executable to cause a data processing apparatus to:
   access historical loan performance data including a plurality of records, wherein a record includes a plurality of borrower attributes and a default attribute associated with a loan, wherein the default attribute identifies whether a borrower defaulted on making payments associated with the loan, and wherein the plurality of borrower attributes includes both quantitative and qualitative components;
   divide each of the borrower attributes into a plurality of borrower attribute levels, wherein dividing the qualitative components includes quantizing the qualitative components into a discrete number of levels;
   combine two or more borrower attribute levels;
   generate, using the one or more data processors, a handle data structure including one record for each combination of borrower attribute levels, wherein the handle data structure represents a set of unified metrics including all possible combinations of covariate patterns, wherein the handle data structure is associated with a joint distribution of risk characteristics, and wherein a default probability is assigned to each record using default attributes from the historical loan performance data;
   generate, using the one or more data processors, a credit risk model, wherein the credit risk model associates a risk level measurement with each record in the handle data structure; and
   perform one or more validation operations on the credit risk model to determine whether the credit risk model is acceptable for use in a production environment.

48. The computer-program product of claim 47, wherein the one or more validation operations include a model performance validation operation or a model compliance validation operation.

49. The computer-program product of claim 47, wherein performing a validation operation further comprises:
   determining a distribution of risk level measurements for two different groups of borrowers using the credit risk model, wherein the two different groups are mutually exclusive;
   determining whether there is a statistically significant difference between the two distributions, wherein disparate treatment corresponding to one of the groups is identified when a statistically significant difference is determined; and
   adjusting one or more of the risk level measurements of the credit risk model when disparate treatment corresponding to one of the groups is identified.

50. The computer-program product of claim 49, wherein the instructions are further executable to cause the data processing apparatus to:
   determine whether each distribution corresponding to each group's handle data structure is ranked logically when adjusted by the corresponding risk level measurement.

51. The computer-program product of claim 50, wherein the instructions are further executable to cause the data processing apparatus to:
   logically rank the distributions by sorting the distributions according to the corresponding risk level measurement.

52. The computer-program product of claim 49, wherein the instructions are further executable to cause the data processing apparatus to:
   whether one or more of the distributions corresponding to of handle data structure is internally inconsistent based on a logical criteria.

53. The computer-program product of claim 49, wherein the instructions are further executable to cause the data processing apparatus to:
  determine whether the distributions corresponding to each group's handle data structure are ranked identically.

54. The computer-program product of claim 47, wherein the borrower attribute levels are subjective levels.

55. The computer-program product of claim 47, wherein a record in the handle data structure represents a covariate pattern that is predictive of the default probability.

56. The computer-program product of claim 47, wherein a record in the handle data structure represents a homogeneous segment in terms of risk, performance, and choice behavior.

57. The computer-program product of claim 47, wherein the instructions are further executable to cause the data processing apparatus to:
  segment borrowers based upon primary underwriting factors.

58. The computer-program product of claim 57, wherein the handle data structure allows for treatment of specific segments by embedding class priors with different thresholds and business policies.

59. The computer-program product of claim 47, wherein the risk level measurements predict the default probability.

60. The computer-program product of claim 59, wherein a risk level measurement is associated with a record in the handle data structure by a handle number.

61. The computer-program product of claim 60, wherein the association of the handle number provides a direct comparison between observed risk in the historical loan performance data and predicted risk in output data of the credit risk model.

62. The computer-program product of claim 47, wherein performance of the credit risk model is measured through credit risk and compliance risk perspectives.

63. The computer-program product of claim 47, wherein the performance of the credit risk model is measured through an optimization process.

64. The computer-program product of claim 63, wherein a risk quadrants plot is used to balance trade-offs between compliance risk and credit risk in adjusting the risk level measurements.

65. The computer-program product of claim 63, wherein outputs from the optimization process facilitate model rebuilding according to available resources.

66. The computer-program product of claim 47, wherein the handle data structure integrates the quantitative and qualitative components.

67. The computer-program product of claim 47, wherein the credit risk model is developed through a model consensus session to provide model evaluation, specifications, and selection.

68. The computer-program product of claim 47, wherein the instructions are further executable to cause the data processing apparatus to:
  perform override analysis by matching override incidence to the records in the handle data structure, wherein results from the override analysis are used as feedback and in creation of records in the handle data structure and model performance evaluation.

69. The computer-program product of claim 47, wherein the qualitative components are based on subjective judgment assessments of conditions.

* * * * *